Nov. 25, 1969

J. H. FORKNER 3,480,456

COATING METHOD

Filed Jan. 3, 1968

INVENTOR.
JOHN H. FORKNER
BY

ATTORNEYS

United States Patent Office

3,480,456
Patented Nov. 25, 1969

3,480,456
COATING METHOD
John H. Forkner, 6870 W. Herndon,
Fresno, Calif. 93705
Continuation-in-part of applications Ser. No. 211,181,
July 20, 1962, and Ser. No. 289,277, June 20, 1963.
This application Jan. 3, 1968, Ser. No. 695,520
Int. Cl. B44d *1/02*
U.S. Cl. 117—3                                                            10 Claims

ABSTRACT OF THE DISCLOSURE

A method for applying resin or resin containing materials to the surfaces of various products. The material is applied as powder particles under low temperature conditions, and thereafter the powder is set or cured at a higher temperature. The resin may be thermoplastic or thermosetting and may contain a blowing agent.

CROSS-REFERENCE TO RELATED APPLICATIONS

This application is a continuation-in-part of my copending applications Ser. No. 211,181 filed July 20, 1962 (now abandoned), and Ser. No. 289,277, filed June 20, 1963, now abandoned. Also reference is made to my copending applications filed simultaneously herewith entitled "Fibrous Product" and "Resin Containing Product."

BACKGROUND OF THE INVENTION

A wide variety of coating techniques and materials have been employed for the surface finishing or coating of various objects. In many instances, as, for example, where the surface is without substrate areas and the coating may be relatively thick, the requirements and materials are satisfactory. However, in some instances, as, for example, in the textile industry, the requirements are critical and require special techniques and materials. Initial reference can be made to the treatment of fabrics (e.g., cotton, wool, or synthetic) to provide more body, wearability, water-repelling and stainproofing. Here the techniques and materials are mostly such as will develop the desired characteristics, while at the same time avoiding any objectionable changes, such as undesirable changes in weight, body, feel or appearance. Application of water-repelling materials (e.g., resin dispersed in an emulsion or solvent) as a spray or by dipping, is for many reasons undesirable. The solvent soluble resins are usually removed by dry cleaning liquids and laundering detergents. Emulsions can compact certain fabrics. The use of a solvent solution or dispersion is a relatively wasteful and hazardous procedure for applying a finish, unless expensive solvent recovery equipment is employed.

In some instances, thermoplastic dry powders have been applied to fabrics followed by heating to effect fusion. However, particle dispersion in the techniques employed have not afforded good coverage over exposed surface areas or as fine a coating as desired. Therefore, the use of such methods has been restricted to instances where a non-uniform or visible application can be tolerated. Aside from imparting water-repellent and stainproofing properties, there is a need in the textile industry for relatively simple methods of applying without solvents or emulsions, the variety of newly developed resins to textile filaments, yarns, woven and nonwoven materials and fabricated products.

In addition to recognizing the needs outlined above, there is a need in many instances to materially alter the properties of various materials, as for example, raw filamentary materials, partially processed raw filamentary materials, or products made from such raw or partially processed materials. Particularly reference can be made to treating raw, partially processed, or products containing filaments (including natural and man-made) to impart greater strength and resilience, whereby certain materials can for example be upgraded or made suitable for new purposes.

SUMMARY OF THE INVENTION AND OBJECTS

This invention relates generally to methods for the multiple or irregular surface areas and those made of filaments and fibers, and particularly to methods for application of certain coating materials in powdered form.

It is an object of the present invention to provide a novel method for the application of a variety of coating materials of both thermoplastic and thermosetting properties and which are characterized by use of powder particles in dispersed condition.

A further object of the invention is to provide a novel method of the above character which makes possible application of coating materials without saturating the object with a liquid carrier medium or solvent.

Another object of the invention is to provide a novel method for use in the textile industry, as for example, the treatment of fabrics or yarns made from natural or man-made fibers, whereby various desired properties can be imparted. In this connection my method is characterized by application of dispersed powder particles of a size substantially less than the diameter of the fibers of the fabric or yarns.

Another object is to provide a method for the treatment of filamentary products whereby the object can be preformed and retained in desired shapes by attaching the filaments to each other at their multiple points of contact. This serves to provide a new resilient product of isotropic properties with air voids predominant therein.

Another object of the invention is to provide a novel method for the dispersion of powdered materials, including various plastic and plastic-containing materials.

Another object of the invention is to provide a novel method for the manufacture of various coating materials in finely divided powdered form.

Another object of the invention is to provide a novel method for the manufacture of finely divided powder from various thermoplastic or thermosetting source materials.

Additional objects and features of the invention will appear from the following description in which the preferred embodiments have been set forth in detail in conjunction with the accompanying drawing.

In general, my method employs a resin in powdered form at a temperature below 32° F. The powder is applied to the surfaces of the product to be treated, such as surfaces of natural or synthetic fibers or filaments that may be in the form of woven or unwoven fabrics, carpeting, loose fiber masses, yarns, slivers and the like, after such surfaces have been cooled below ambient temperature. Thereafter the temperature of the surfaces and powder are elevated to ambient or higher to form the final coating.

DESCRIPTION OF THE PREFERRED EMBODIMENTS

Figure 1:
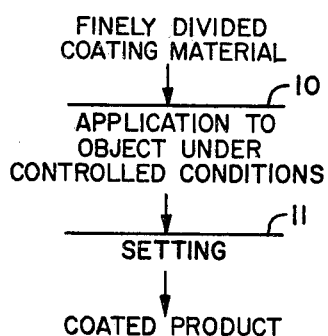
FIGURE 1 is a flow diagram illustrating the general character of my method.

My method as generally outlined in FIGURE 1 consists of supplying a finely divided coating material to step 10, where it is applied to an object under controlled conditions. Thereafter in step 11 the application is caused to be set whereby the coating material is bonded to the surfaces of the object. As will be presently explained in greater detail, the coating material is selected in accordance with the object to be treated and the type of coating desired. I employ materials capable of being dispersed in a powdered form, and capable of being bonded as a coating on the surfaces where it is desired. In general, I employ materials which of themselves, or when treated according to my method, have the following characteristics in common: at low temperature they are brittle, not adhesive, and when subdivided while still brittle they can be deposited in a dispersion of individual particulates. At ambient temperatures or above they are adhesive, fusible, and flowable or expandable. With time or at elevated temperatures they set firm and with proper curing are nontacky. Particular reference can be made to the common waxes, and to thermoplastic and thermosetting resins and plastics, rubbers, and elastomers. Also I may use blends of such substances with materials like waxes, gums, plasticizers, solvents and the like. Many of the lower density materials used become brittle of themselves at low temperatures. However, as will be presently explained, certain medium and high density plastic resins (e.g., nylon) become brittle at low temperatures only when treated in a particular way. Before being formed into a finely divided powder, the source coating material may be a liquid or solid mass, a mass containing an activator, a mass that is in part aerated or blown, or contains a blowing agent, or a liquid material which solidifies in a compound at low temperature. As examples of liquid materials reference can be made to materials contining latexes or emulsions, and liquids that are hardened by an activator and/or by heat. In some instances the coating material may include additives such as dyes or pigments, pesticides, water or salad oil repellent, anti-inflammable and other selected chemicals. Depending on the results desired and the material selected, the basic coating material is bonded to the surfaces of the object, and this may involve flowing, fusion and/or expansion.

The controlled conditions maintained in step 10 may be varied in accordance with the coating material employed, and the object being coated or treated. The finely divided coating material may be deflocculated to minimize formation of clumps and to facilitate deposition.

It may be explained that when many low density coating materials are in finely divided or powdered form the individual particles tend to clump, aggregate, or cling together, which I attribute to surface attraction, cohesion or electrostatic effects.

It is not completely satisfactory to refer to the particle size of resin powder by screen measurements, due to possible irregular configurations and the difficulty of screening certain finely divided materials. Examples of specific micron dimensions with which fine coating can be achieved are hereinafter detailed, although both finer and coarser particle sizes are applicable in my method. With proper application, the finer the particle the finer and more uniform can be the coating applied. At ambient temperatures such fine powders are difficult to uniformly apply to an object by conventional dusting or sifting methods, due to tendency of low density materials to clump, and tending of most thermosetting resins to become sticky. The problems are multiplied when it is desired to apply the powder to substrate surfaces, and for the resulting coating to achieve certain predetermined effects. The essential problem is particle distribution which is made impossible or difficult to achieve because of flocculation or clumping, or particle stickiness. I have found that the tendency of such powdered materials to flocculate can be overcome by the maintenance of certain conditions. One such condition is the maintenance of the powder and the air or other gas in which it may be dispersed at a temperature well below 32° F. (e.g., 0 to −50° F.). At low temperatures surface attraction, cohesion and like effects, which exert forces to retain fine particles together, are eliminated or greatly reduced and surface characteristics of the particles tend to be altered, as by becoming relatively hard and glass-like. Certain powdered resins can be effectively dispersed at low temperature levels, without the use of other dispersing agents. Also I have found that some fine powders can be more effectively dispersed at low temperatures with certain dispersing agents. Particularly, I have found that powdered ice is an effective dispersing medium for certain materials. Ice is unique in that it economical and will disappear in the process. As will be presently explained in greater detail, the ice may be intimately intermixed with the powdered coating material, or in some instances the coating material may have been incorporated with the water which is frozen to form the ice. In any event, I have found that the presence of a substantial amount of powdered ice together with the finely divided coating material, enables effective dispersion of certain powders whereby the powder can be caused to penetrate into substrate regions of an object like textiles or fabric, without surface incrustation. At low temperatures of the order of 0 to −50° F., ice particles become quite hard with gloss surfaces, thus effectively preventing flocculation of the intermixed coating powder. Where water is incorporated with fragments or filaments of the material as by the methods to be presently described, followed by freezing and grinding, the ice may play an important part in attaining the particle fineness desired. The maintenance of a low temperature, and the presence of powdered ice, also minimizes electrostatic or other surface attraction effects between the object and the coating material.

It is preferable, in some instances, that the surfaces of the object to be coated be precooled to a temperature below 32° F. This faciiltates effective dispersion of the powdered coating material into substrate regions of material like textiles and their filaments, yarns or fabricated products by reducing clinging on exterior surface areas. Further, the lowered textile temperature reduces transfer of heat to initial clinging particulates which when present accelerates their attraction to other resin particles resulting in areas of over application. A reduced temperature of the surfaces facilitates settling of the resin dust into substrate areas. By use of a predetermined temperature differential between the surfaces and the particles, the amount of coating can be partially controlled. A cold surface at the end of an application facilitates removal of excess powder as by shaking or pneumatic blowing or suction.

In addition to powdered ice, powdered Dry Ice (i.e., solid $CO_2$) has been found to have some dispersing effect, but, in general, it is not deemed to be as effective as powdered ice. However, with some products like the more common waxes and lower density thermoplastics, powdered Dry Ice may be very effective and it may be used alone or with powdered ice to maintain a desired low temperature level. Assuming dispersal of the chilled brittle coating powder in cold air or other gas, with or without other mediums such as powdered Dry Ice, or both, the dispersed material can be caused to impinge the object to be coated. By application of pneumatic suction to the underside of the fabric, penetration into substrate areas can be promoted. However, I have found that active vibration or tamping of the fabric during the coating step is an excellent method to cause fine coating particulates to be deposited or settled into substrate regions.

The setting step 11 depends upon the character of the coating material. Assuming that the coating material is thermoplastic, and that powdered ice is used in step 10, then the setting operation involves elevation of the temperature to above the melting point of the resin used to effect flowing and attachment of the resin to the filament accompanied with fusion of the particles. Flowing and fusion is accelerated and made more effective where direct heat and compression can be applied. Where the resin is thermosetting, with or without a blowing agent in addition to an activator, curing and expansion may in some instances be accomplished at ambient temperatures over an extended setting period. Elevated temperatures effect more fusion and quickly set and expand the resin.

Figure 2:
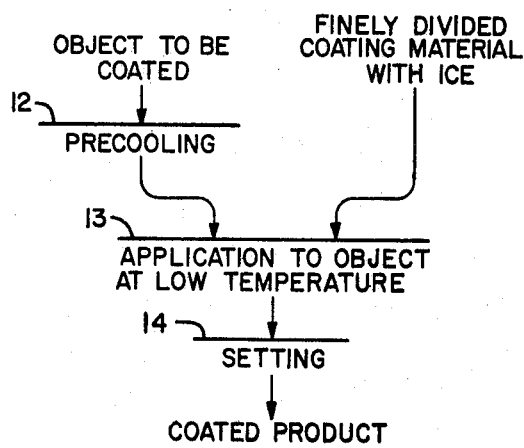
FIGURE 2 is a flow diagram illustrating more specific procedure.

The flow diagram of FIGURE 2 is somewhat more specific than FIGURE 1. Here the object to be coated is subjected to pre-cooling at 12 whereby the surfaces are lowered to a temperature below 32° F. A finely divided mixture of coating material and ice is prepared and supplied to the step 13, where the coating material is maintained in dispersed condition at a low temperature (e.g., —0 to —50° F.) and is applied to the object. After the application has been made, the object is subjected to the setting operation 14, where the coating material is bonded to the surfaces on which it has been deposited.

Figure 3:
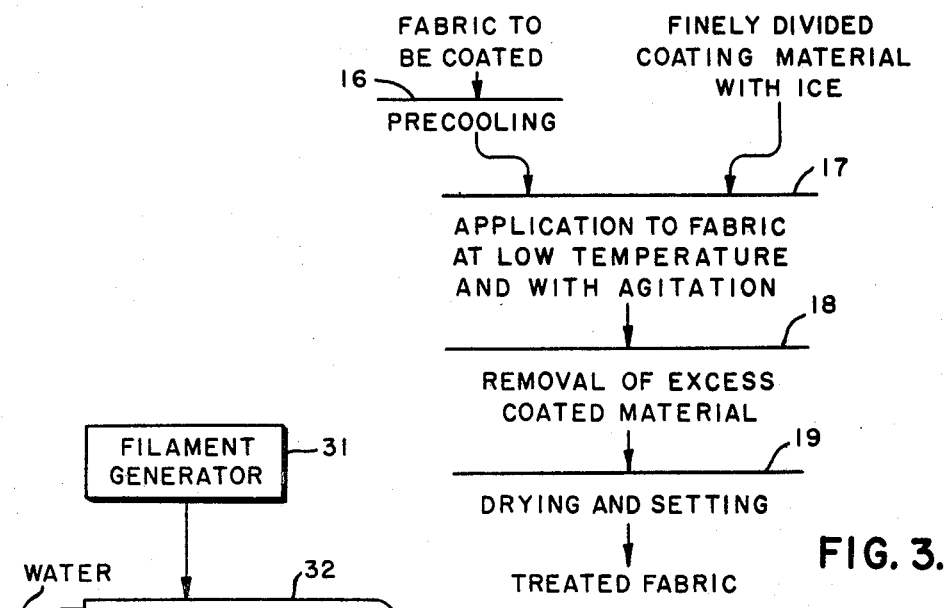
FIGURE 3 is a flow diagram illustrating application of my method to the treatment of fabric.

FIGURE 3 illustrates my method as applied to the textile industry, as, for example, for the treatment of woven fabrics. The fabric to be treated is subjected to chilling or precooling at 16, whereby at least its exposed surface temperature is lowered to a value of, say, 32° F. or lower. In step 17, the precooled fabric is contacted with finely divided material with ice as by sifting the powder on the fabric. The powder particles are of a size substantially less than the diameter of the fibers or filaments of the fabric. Here again, a low temperature is maintained to promte a deflocculated condition of the powder. In general most powdered materials suitable for use in my method are effectively deflocculated at an optimum temperature level of the order of —20° F. or lower (e.g., in a working range of —20° F. to —50° F.) although a few materials tend to deflocculate at about 0° F. Preferably the fabric is subjected to agitation or vibration, thereby facilitating penetration of the powder into substrate regions. In step 18 excess coating material is removed from the fabric, as by shaking or agitation, or by a blast of air. For light evenly dispersed coatings, preferably this is carried out while the exposed surfaces of the object are at a temperature below 32° F., and in an atmosphere of air or other gas at or below the temperature of the coating material. In step 19 the fabric is subjected to drying with subsequent setting. Melting of ice at this point provides moisture, but the amount of moisture is insufficient to saturate the fabric. Actually, it provides a degree of dampness such as is suitable for pressing. Assuming that the coating material is a thermoplastic, then setting requires heating to the fusion point whereby the particles of thermoplastic material are caused to fuse and flow and bond to each other and to the surfaces of the fibers with which they are in contact. Drying and melting with heat can be carried out by pressing the fabric with heated irons, by exposure to steam and to steam and pressure, by exposure to hot air, or to infra-red or radiant heat. As will presently be explained, in some instances the particles may contain a blowing agent whereby they expand when heated or with longer exposure at ambient temperatures. Depending upon the character of the coating material, the method of depositing and the amount employed, the properties imparted may be such as durability and wearability, particularly with acetate and rayon fibers, filament and yarn support and springiness most obvious with cotton, soil resistant and water repellency, extension of the covering powder of bulky fabrics, wrinkle resistance, ability to retain creases, and (for the wax-like or the more flexible resins) a softer feel to the hand and imparting a feeling of warmth. Warmth may actually be accomplished by greater bulk with greater extension of surface areas as exemplified by blown filament attached resin particles. Such cellular attached resin particles of themselves impart thermal insulation properties and also enhance the heat insulating properties of fabric by reducing the size of individual voids and entrapping or restraining air circulation. Maximum expansion of blown resins is achieved with unrestrained filaments or fabric during curing at elevated temperatures. Direct contact with a hot iron with accompanying compression serves rapidly to heat the coated product to a temperature level of the order of 200° F. to 350° F., and the compression with heat causes a greater flow and fusion of particles to each other and to the surfaces of the filaments and causes attachments of filaments to each other. To the extent heat and compression is applied either low or high density effects are obtained.

There are many variations of the setting or curing step resulting in fabrics of pronounced altered features. With untwisted strands hot pressing with an iron can cause a bonding along the entire length of adjacent filaments, with the finished strand being ribbon-like. On the other hand the untwisted strand can be cured in hot air with the filaments under tension, whereby the finished strand is rounded. With a Bendix Home Ironer, for example, direct heat can be applied to unwoven fabric with controlled compression. Some heat is radiated to substrate regions resulting in developing predetermined density with filaments bonded predominantly at their interspaced points of contact. Heat by metal contact, or direct or indirect steam heat, may be used with masses of filaments or fabrics which are to be molded to predetermined shapes. Hot air curing is preferred where direct contact heat is not practical or desirable, as with carpets, and where compression or bonding of the yarn together is not desired (e.g., bulk knit sweaters). With hot air applications compression may be applied for molding or for attaining a predetermined density. Compression of a mass of filaments coated as described will result in products retaining their preformed shape and in addition the compression multiplies the contacting points of the filaments, effecting many unique results. Products of this character and methods for their manufacture are later described in greater detail.

There are many applications in the textile industry where the method of FIGURE 3 can be employed. Thus, it can be employed for the treatment of individual filaments or fibers, before or at various stages of manufacture, with such filaments being incorporated in twine, yarn, unwoven or felted and molded fabrics. With respect to the types of textiles or fabrics which can be treated, the method can be applied to most of the more common woven cloth, various types of carpets and floor coverings, manufacture of battings, insulation and the so-called unwoven or felted fabrics, or molded shapes. With respect to molded or unwoven or felted fabrics, my method provides an effective way to bond the filaments together, to retain a desired density, and with certain blown thermosetting coatings, to achieve isotropic properties in that deformation and recovery is substantially the same in all directions due presumably to bonding of the filaments in prestressed condition. While treatment of yardage at the mill has wide commercial application, the method can be applied to many finished goods, such as completed garments and the like. This is in part because the cloth or fabric is not saturated with a liquid medium (e.g., solvent or emulsion). The equipment required is in many cases quite simple and inexpensive, and fire and personnel hazards are reduced. Thus effective finishes according to my method can be applied by local laundry and dry cleaning establishments, and textile fabricators as well as the mill.

As mentioned above, application of my method to fabrices can be for the purpose of imparting waterproofing and stain resisting characteristics. Common waxes like paraffin or beeswax can be employed. Although these are removed by conventional laundering and dry cleaning, a new application can be readily applied. A wax powder having fine particles can be made by various common attrition or pneumatic mills using low temperatures. Also a very fine subdivision can be made by atomization of the heated wax into a cold chamber. At ambient temperatures such powder tends to form clumps or aggregates, because of attraction effects. This flocculation of particles is particularly active when the particles are dispersed in an ambient air-stream. This agglomeration is accentuated when the particles are cool and the air stream is at ambient temperature, due to moisture condensing on the particles in suspension, which greatly accelerates their flocculation properties. When cooled to a temperature level of the order of 0° F. to $-50$ °F., the powder is deflocculated whereby it can be applied by direct contact with a product (e.g., cloth) to be treated. Also, such powder can be effectively dispersed in cold air or other gas, and applied by entrainment (i.e., dispersion) in an air stream, effecting, if desired, impingement of the fabric by exposing the product of the zone of powder dispersion while the air is kept turbulent or subjected to recirculatory currents. Suction applied to certain fabrics, with or without impingement of an air stream in which the powder is dispersed, is helpful in achieving substrate penetration of powder particles. A refrigeration medium like powdered Dry Ice can be intermixed with the powder to effect deflocculation by cooling, or added to a dispersion of the powder in air to serve as a refrigerant. Powdered ice has been found to be effective as a dispersing medium, together with low temperature, and with or without a medium like Dry Ice. Thus, the collected powder can be dispersed by mixing with ice in a grinding mill, at a temperature of the order of —20° F. or lower. The amount of ice required is relative to various operative conditions and the character of the wax or blend selected, but may, for example, range from an amount equal in weight to 50% of the wax or to as much as 20 times the weight of the wax. As will be presently explained with reference to dispersing certain types of wax-like materials, water can be incorporated as a surfactant with the wax particles, with or without other agents, and the wet mass frozen and ground to a low temperature level (e.g., 0° F. to —50° F.) whereby a deflocculated material is obtained which can be readily dispersed in air or deposited directly.

Fabric finished with a wider range of desired benefits and that are more resistant to laundering, can be obtained by using medium or higher density thermoplastic resinous materials blended with the common paraffin waxes. Such wax-like blends, when dispersed in powdered form in fabrics in the manner described with reference to FIGURE 3, followed by drying and heating, serve to provide a treated fabric which has good water-repellent and stain resistant features. What is deemed to be of greater importance is that such treatment can be used to impart new properties, such as more body, to the fabric. Silicones can be added to either the wax or ice content of the powdered material (e.g., from 10% to 20% of the ice content), to enhance stain and water-repellency.

I can employ fluorochemical type resins of acknowledged properties in providing salad oil and water-repellency to textiles (e.g., fluorocarbon vinyl-type ester and polymers such as disclosed in United States Patents Nos. 2,693,458 and 2,641,573). Such materials when in the form of wax, or in compounded water containing emulsions, are brittle at low temperatures (e.g., —20 to —50° F.) and in such condition are susceptible to fine grinding and to dispersion without flocculation.

With respect to resins or resin containing coating materials which can be effectively used in my method, I have found that many of them are difficult to produce or obtain in finely divided form. For example, materials such as blends of medium and high density resin and paraffin wax, are difficult to reduce to a very fine powder by conventional methods. When in molten form such materials can be sprayed but the result is a mass of fine cobweb-like filaments. As shown in FIGURE 4, I have found that a very fine powder can be obtained from such materials by a special method. Thus, in step 21 a thermoplastic coating material, which may be a wax-like plastic blend, is formed into cobweb-like filaments. This can be carried out by supplying the thermoplastic material at a temperature well above its melting point, and subjecting it to spraying, with the resulting filaments being immediately chilled and solidified by contact with cool air or other gas. Operation 21 can be carried out by use of several types of known equipment, such as atomizing nozzles of the pressure or pneumatic aspirating type, or rotary spinning devices. In step 22 the filamentary material is deposited in cold water, where it is subjected to grinding or disintegration to break up the filaments into agitated water as the filaments are generated, although if desired, the filaments may first be deposited on a surface such as a belt conveyor, and then introduced into water for wet grinding. Various types of known equipment can be used for water incorporation, as for example disintegrating equipment of the "Waring Blendor" type. In step 23, excess water is removed from the partially ground material, as by permitting the water to drain through a screen. The resulting material is then subjected to freezing at 24 to produce hard frozen flakes. In step 25 the frozen material is subjected to further grinding, while being maintained at a temperature well below 32° F. (e.g., —0 to —50° F.). This can be carried out by use of any one of several known types of attrition mills, such as a high speed hammer mill, or a colloidal mill of the pneumatic type. The material formed in this step is a fine powder that is relatively free of clumps or aggregates (at the low temperature level) and when mechanically dispersed directly or in an air stream of approximately the same temperature it will remain unflocculated. Particle dimensions in microns will subsequently be described for typical instances. FIGURE 4 illustrates some of the fine powdered material from step 25 being supplied directly to step 26, where it is supplied in dispersed condition to the object to be coated. Thereafter the coated object is subjected to heating, flow and fusion at 27 as previously described, to produce the final coated product.

FIGURE 4 illustrates some material from step 25 being supplied to step 28, where it is heated and dried to remove the moisture content. This results in formation of a dry powder which is in the form of clumps or aggregates, which may be reground, and stored at 29 until packaged for shipment. The value of wetting the atomized cobwebs by direct contact with water before freezing and grinding it to provide a brittling effect before grinding, and to change the surface properties of the dried powder, so that it is less flocculent at both ambient and low temperatures. Step 20 represents the dispersion of such dry powdered material with or without ice to form material for supplying step 26. Such redispersion can be carried out by supplying the powder to an attrition mill together with a quantity of ice, whereby the ice is reduced to the form of a powder and whereby a mixture is formed between the powder and the ice particles.

Instead of applying water to the filaments by immersion and agitation followed by draining, a limited amount of water can be applied to the filaments by spraying the filaments into a zone in which water droplets are maintained by spraying, atomization or condensation to form water vapor.

In carrying out the method described with respect to FIGURE 4, it has ben found that the material produced by operation 22 consists mainly of rod-like particles having a diameter corresponding to that of the filaments produced in step 21. In step 25 the rod-like particles are subdivided with the formation of very fine particles or fragments, which individually appear to be elongated or needle like. As measured along their major axes, such particles may, in typical instances range from about 9 to 90 microns in length, and as measured on their minor axes, they may be of the order 0.5 to 10 microns in thickness. In contrast, the thickness of typical absorbent cotton fibers measured are of 8 to 30 microns.

Figure 4:
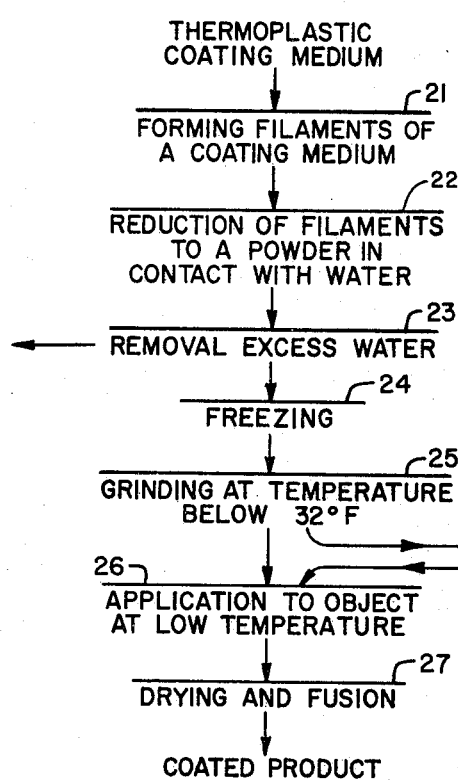
FIGURE 4 is a flow diagram illustrating my method for the manufacture of fine powdered material from a source material which forms filaments when sprayed.

The method shown in FIGURE 4 has a unique effect upon the ability of the coating material to retain water. As previously mentioned filament formed wax-like materials are water-repellent. However, when the filaments are subjected to attrition in water, the water becomes intimately associated with the filaments and with the particles resulting from attrition. While the reason for this effect is not clearly understood, it is believed due to formation of lyospheres or enveloping films of water about the particles, under such conditions. In any event after attrition in step 23, the partially ground material is capable of retaining water to the extent of about ¼ to 20 times its weight. Under the conditions existing in step 25, namely with the rod-like fragments being enveloped with ice and at a low temperature level, they are caused to be brittle and therefore, they are susceptible to fine grinding. Microscopic examinations of the very finely divided material resulting from step 25 indicate that a substantial portion of the water remains associated with the particles in the form of ice bonded to the exterior particle surfaces, together with some free ice particles.

While it is not necessary that the material retain excessive water at the end of step 23, it is desirable to retain a substantial amount of water sufficient to provide a proper grinding action in step 25, and sufficient to provide the desired controlled conditions of dispersion in step 26. In this connection good results have been obtained when the retained moisture and the amount of ice present is within the limits of ¼ to 10 times the weight of solid coating material.

Figure 5:
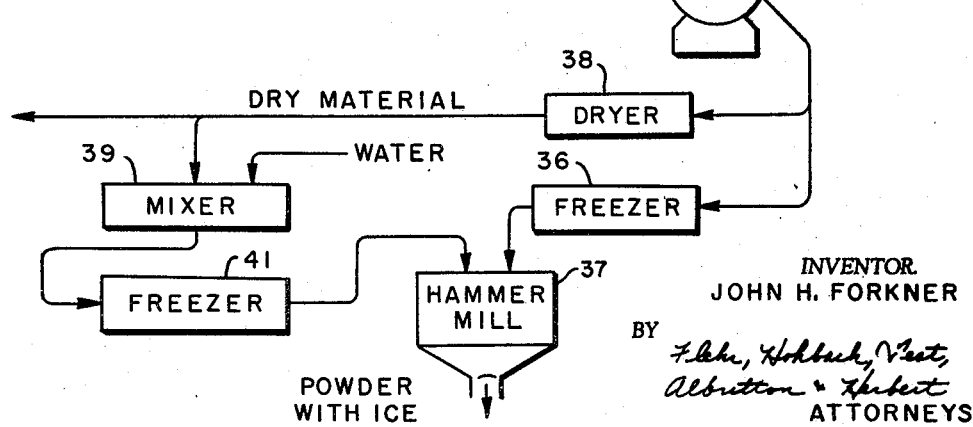
FIGURE 5 is a schematic view showing equipment suitable for carrying out the method of FIGURE 4.

FIGURE 5 illustrates a suitable system for the continuous production of a powdered wax-like thermoplastic coating medium, such as is suitable for use in the method of FIGURE 3. In this instance the filament generator 31 is shown receiving a molten thermoplastic material which may be a blend of microcrystalline paraffin wax, with a suitable plastic-like medium to high density polyethylene. As previously mentioned the filament generator may be a pressure spray atomizer, a compressed air aspirator type nozzle, or a rotary spinner. The solidified thermoplastic filaments are received in a stream of water flowing through the launder 32. This launder feeds one or more attrition mills 33 and 34, which may be of the Waring Blendor type. The ground material and water are delivered to the filter 35, where excess water is removed to produce a wet filter cake or slush.

A part of the filter cake is shown being supplied to the continuous freezer 36, after which the frozen material is supplied to the hammer mill 37 to produce a finely ground powder containing ice. Another part of the filter cake is shown passing through the dryer 38, for removal of moisture, thus producing a dry material which when reground can be stored and used as desired. When wetted this dried powder does not attract or hold on its surface as much water as the material when received from the atomizer, which I attribute to its altered surface density. However, it has good coating properties and at lower temperature, with or without ice, it is relatively deflocculent. Dry material produced in this manner may be supplied to the mixer 39 where it may be intermixed with water and with considerable agitation, after which the wet material is supplied to the freezer 41, to produce the frozen brittle material suitable for feeding the hammer mill 37. The ability of such predried material to retain water is usually of the order of 1 to 5 parts water to 1 part of the predried material. It can, of course, be suspended in greater quantities of water or foams as later described with similar powders. An alternate procedure is to mix finely powdered ice with the predried powder (or coarser ice ground together with the powder) at a temperature level of 0° F. to minus 50° F. in proportions of ¼ to 10 times the weight of the wax-like powder.

As pointed out above, one feature of the method as described with reference to FIGURES 4 and 5 is the incorporation of surface retained water with the coating material, followed by freezing and grinding. Although ordinary tap water can be used for this purpose, I have found that the incorporation of water can be facilitated by the use of small amounts of a suitable surface active wetting agent. The wetting agent may be a common household detergent (e.g., Tide) used in suitable amounts, such as 1 to 20 grams of the detergent to one gallon of water. The higher amounts of detergent cause a heavy foaming effect that will increase the bulk of the drained thermoplastic particles. When frozen and ground a very low density deflocculated powder is formed which has been found desirable for dispersion into bulky fabrics and unwoven materials. Other more complex wetting agents can be employed, such as quarternary ammonium compounds, compounds of the sulfonated oil type, oleic acid, fatty amines and derivatives and the like.

The formation of lyospheres about the particles appear to be facilitated by the use of surface active agents as described above and also by adding a suitable colloid in the water. Particular reference can be made to such materials as water soluble resin glue, emulsions and commerical gums and aligns exemplified by gum arabic, glutten, gelatin, caseinate, agar and the like. These agents form lyospheres or envelopes around the particles that when reduced to the low temperatures indicated for depositing (0 to −50° F.) become glassine like in providing a smooth hard surface not conductive to flocculation. When intermediate drying is used, as described with reference to FIGURES 4 and 5 similar properties are developed. Also, such agents form suspenders for the particles to facilitate water retention and freezing.

Previous reference has been made to use of a coloring material. Referring to FIGURE 4, a suitable water soluble dye can be introduced into the water used in step 22, whereby the dye is present in the ice content of the powdered material being applied in step 26. When the ice melts in step 27, the dye is released and applied to the individual fibers of the fabric. Also the coating material itself may be colored as by the incorporation of suitable dyes and pigments. A primary purpose for use of coloring, is that a dye or pigment may be added whereby the added wax is caused to blend more naturally into the fabric if the same color. This process may be used in recleaning and reprocessing of used carpets and household fabrics, where the added color will support the original. Powdered additives may be used with the base coating for special effects, such as metallic powders. The powdered additives may have a particle size comparable or smaller than the particle size of the base coating material (e.g. for light reflection or absorption). Larger particles can be used for special effects, such as to impart surface abrasiveness. Harder inert crystals or aggregates may be selected for this purpose such as silica, emery, etc.

Suitable coating materials can be obtained in the form, for example, of adhesive acrylic resins or a liquid vinyl latex that either used alone or in dilution with water will freeze to a brittle frangible consistency. The latex may consist of a nonaqueous solvent together with water and the desired coating material, all combined as a stable emulsion. I have found that such emulsions can be frozen in flakes, sheets or chunks of convenient size and thinness and thereafter subjected to grinding in a suitable mill of the attrition of pneumatic type. A low temperature should be maintained during grinding, as by applying conventional refrigeration, particularly to the air drawn into the mill, or by supplying sufficient solidified carbon dioxide for this purpose. The Dry Ice content of such finely ground powder may be in the order of ¼ to 20 times the other solids present. Such ground frozen latex emulsions can be used to advantage where it is desired to apply a finely divided pigment in addition to the other coating materials. The pigment can be any one of the types commonly used in latex paints, such as titanium oxide and the like.

The method of producing fine powders described above, wherein fine grinding is carried out at low temperature level with the particles enveloped or dispersed with ice, can be applied to materials other than filament forming thermoplastics and latexes. Previous mention has been made to formation of powder particles of waxes (e.g., paraffine or beeswax) by atomizing molten wax and chilling the particles. Similar waxes may be combined with higher density thermoplastics, and in the form of flakes at temperatures of the order of 0° F., they can be readily comminuted, as for example in a Waring type blender with a bowl confining the particles around and over the rotor, or a hammer or pneumatic mill of conventional design. Such atomized wax spheres or comminuted wax particles may be deposited in some instances at low temperature, either directly in contact with the product to be coated, or from a cold airstream in which the powder is dispersed, and preferably with prechilling of the product. With suitable vibration or agitation and removal of excess powder while the product is cold, good results can be obtained with many such waxes on many types of fabrics.

To improve the effectiveness of the coating in terms of achieving a fine dispersion of coating particles and attaining good uniformity, such powdered materials or other wax powders can be agitated with water in equipment of the Waring Blendor type. The water may contain a small amount of a colloid like gum arabic or surface active detergent. After draining off excess water on a filter membrane, the wet mass is frozen and then subjected to grinding at a temperature level of, say, −20° F. In this manner, commencing with relatively coarse material, relatively fine comminution can be achieved by grinding the frozen mass. Likewise, then powders can initially be blended with pulverized ice and comminuted at low temperature. In the former instance, the ice is in major part bonded to the particles and in the latter instance it is free ice particles, the latter usually present in major percentage. In either instance the ice performs a dispersing function and it disappears after performing its function.

Many medium and high density thermoplastic materials are available in thin films and as fine and superfine spun filaments. I can coarsely fragmentize these conventional raw materials, which are normally difficult to subdivide to fine particles. The fragments are then incorporated with water, followed by freezing and grinding in the frozen brittle state. Such fine frozen powder can be applied in the frozen state, or for certain purposes it can be dried and deposited in the dried form. The resulting powder can be used to coat certain textiles, as, for example, polyethylene on cotton yardage. By the procedure just described, spun man-made filaments of materials like nylon, Dacron and the like, can be reduced to fine powdered form. It should be noted that powders made from high density plastics as just described do not generally tend to clump at ambient temperature.

Powdered materials of special characteristics are produced by my method from ingredients comprising a medium or high density resin, an activator and a blowing agent, such as are employed for producing foamed plastics. Such powders are maintained relatively stable at a low temperature level. After application to the surface of an object, the particles are caused to enlarge in particle size. Thus, for example, I can employ both open and closed cell fluoro-carbon-blown, polyethylene type polyurethane foam systems, in which the liquid ingredients normally are mixed at about 70° F. and permitted to expand and set. Instead of proceeding in this normal way, I mix the ingredients and permit a minimum expansion to occur (e.g., less than 50% increase in volume). This is achieved by rapidly mixing the ingredients with incorporation of a minimum of air, and preferably at a temperature of about 40° F. Before there is any substantial foaming, the mix is chilled to a low temperature (e.g., minus 20 to minus 50° F. or lower) whereby it rapidly becomes brittle. Thermosetting products usually require lower working temperatures than thermoplastics. The rapid chilling arrests activity of both the activator and the blowing agent. It is desirable to chill rapidly, as for example to 0° F. in about a minute, at which temperature the activator and blowing agent are inactivated. Brittlizing occurs in the range of minus 40° F. The mix may be flaked or formed in thin slabs (e.g., ⅛ to ¼ inch thick) by pouring onto chilling rolls or a refrigerated plate at minus 40° F., or be deposited directly onto a slab of Dry Ice. Such brittle slabs or flakes are then subjected to grinding in high speed attrition or pneumatic mills to produce a powder that is sufficiently fine whereby the bulk of the material, for example, passes through a 200 mesh screen. It should be noted that at sufficiently low temperatures such as −40° F. and lower (as with Dry Ice), this brittle material can be ground in a Fitzpatrick Hammer Mill at 3600 r.p.m. with a 200 mesh screen. The mill should be supplied with air at low temperature (e.g., below 0° F.). A substantial part of the ensuing powder is finer than 200 mesh and approaches such a fineness that it appears like smoke. Other forms of attrition mills can be employed. Thus I have found that it is feasible to employ a Waring Blendor type of mill with a modified bowl whereby the product is kept within or immediately about the rotor region.

At the low temperature level mentioned above, such powder is non-flocculent and readily disperses in cold air or other gas to form what may be described as an airborne material. Therefore, it can be uniformly applied to both exterior surface and substrate areas effecting maximum penetration and dispersion coating, and serving when set to attach the filaments at their contact points in woven fabrics, in nonwoven and molded filaments and yarns. Powder as produced in the Waring Blendor type of mill can be applied airborne or deposited directly onto agitated prechilled products. Assuming that it is desired to treat exposed surfaces of an object, such as non-woven fabric, with a urethane type of powder made as described above, the fabric is exposed to air currents in which the particles are suspended or dispersed preferably after precooling of the carpet surfaces to a temperature level such as from 20 to −20° F. and with vibration or agitation of the fabric to facilitate penetration into substrate regions. The powder is deposited from the air on the exposed surfaces of the fiber. Among other factors, the amount of powder so applied is a function of the amount of powder suspended per unit volume of gas (i.e., powder concentration), the temperature of the fabric, of the powder and air, and the differential between the temperature of the carpet and the air and powder. Also, powder may be deposited directly onto the prechilled fabric, as by pouring on, spreading and agitating. Either with direct application or in airborne media, it may be desirable to flex the fabric so that powder is deposited into the area that is spread and opened by the curvature. Substantial application of vibration or agitation should follow deposit of the powder to settle or penetrate the powder into substrate areas, after which excess powder is removed by shaking or vibration before there has been any opportunity for agglomeration by intensified particle adherence at undesired points. It has been noted that in the use of such urethane powders, the powders are effectively caused to penetrate and to be uniformly deposited on substrate fibers or filaments, which I attribute largely to the fineness of the grind made possible by the brittle properties at low temperature and to the absence of surface attraction effects. Another characteristic of such powders is that they are tacky at temperatures of the order of 0° F. and very brittle at low temperatures of the order of —50° F. Thus by controlling the temperature of the fabric whereby it is of the order of 0° to —20° F. when powder at, say, —50° F. is applied, a uniform powder coating of single particle thickness is caused to adhere to the exposed surfaces, after which excess powder is immediately removed. After application of powder as described above, and after gentle shaking to remove excess surface powder, it is possible for setting to proceed substantially to completion at ambient temperatures, during which period the powder passes through a tacky phase, and the particles greatly increase in size and become bonded to the surfaces on which they are deposited. Generally I find a rapid application of heat immediately following depositing and removal of excess particles achieves best results, with the temperature being campatible to operating conditions and the type of filament and resin. One reason for heat appears to be that with the very thin films exposed on the surfaces of textiles and filaments, the blowing agent seems to dissipate with prolonged exposure without blowing the resin. I find that the smaller particles generally blow with less volume increase than larger particles or thicker aggregates. However, the blow developed is visible under magnification. Again, resins vary with respect to the temperatures and time periods required. With a medical case as hereinafter described, curing of urethane resin can be carried out at, say, 80° F. for about 1 hour. For filamentary strands, the strand may be subjected to air temperatures ranging from 200 to 600° F. for periods ranging inversely from 10 minutes to 10 seconds. Pliovic AO, compounded with Flexol and Celogen, requires a product curing temperature of about 300° F. for, say, from 15 to 20 minutes, which is compatible with certain fibers like cotton.

Assuming that the application is being made to a carpet, it is desirable during the initial phase of such heating, and when setting has proceeded to such an extent as to make the powder frangible, to flex the carpet over a rod or roller to separate the piling or tufts. At this time it is desirable to brush or comb to break apart the piling or tufts and to comb out any loose fiber or oversize bubble-like masses of the resin before they become hard and firmly attached.

With application of resin of the urethane type as described above, pressing with heated irons or compression in heated molds can be applied to change the form of the object, as, for example, to compact woven cloth, to compress unwoven felted material or attached filaments, and the like. When ironing, or with a mangle type, heat and controlled compression is applied to yardage or close woven fabricated clothes, expansion of the fused material is confined somewhat whereby it is caused to expand laterally or in the general plane of the cloth. Pressing with a hot iron can be applied before any amount of activity occurs, whereby expansion occurs simultaneously with fusion, thus effectively spreading the fused material. In this instance it is necessary to apply ironing before the urethane has developed into the setting stage.

Figure 6:
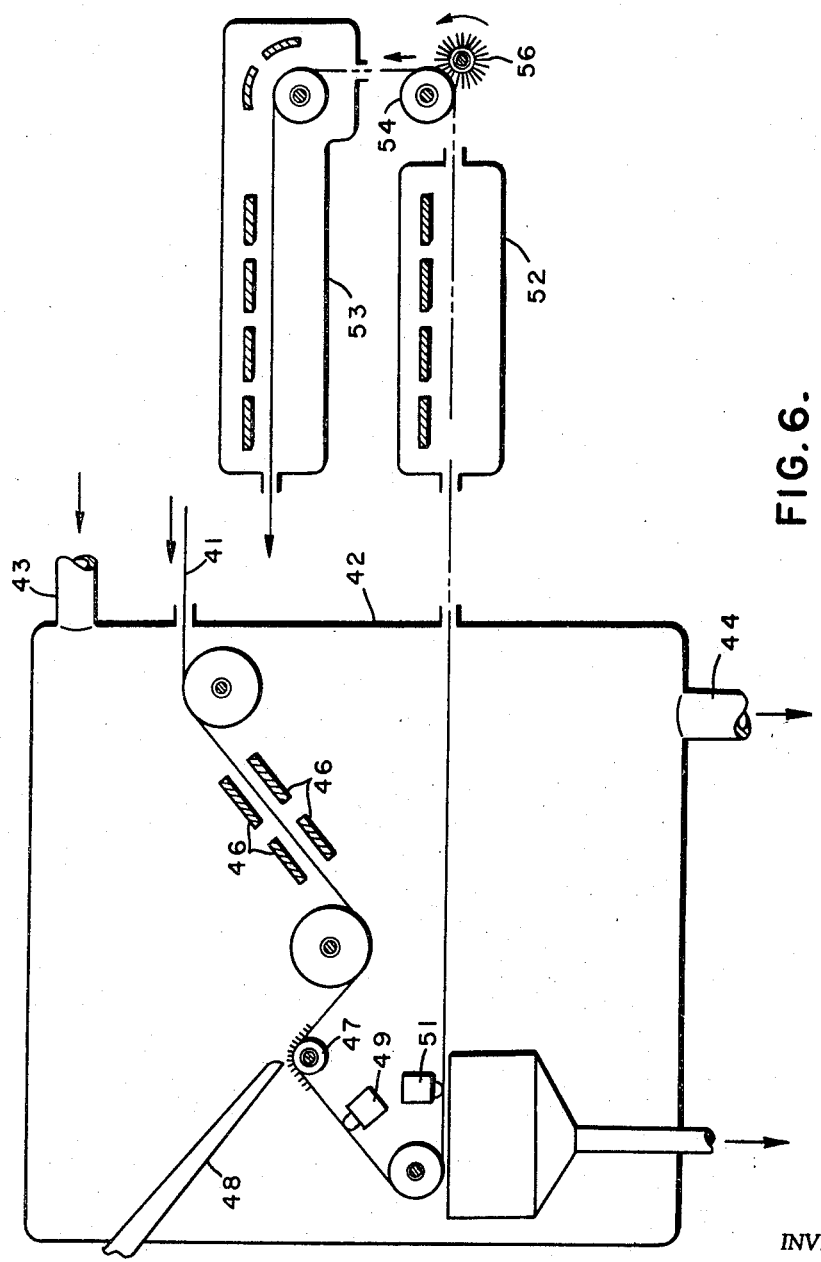
FIGURE 6 is a schematic view showing an equipment and method for the finishing of carpets and oher bulky fabrics.

FIGURE 6 schematically shows equipment for finishing various types of carpeting by means of a urethane or like resin containing an activator. In this instance it is assumed that the resin also contains a blowing agent. The strip of carpeting 41 is guided to enter the chamber 42, which is maintained at a low temperature by cold gas or air circulated through the inlet and outlet pipes 43 and 44. Elements 46 are refrigerated to absorb heat and to precool the carpet. As the carpet flexes over the rod or roller 47, powder is applied from device 48, and thereafter the carpet is subjected to the vibrator 49 to more effectively distribute the powder. Thereafter the carpet is inverted and acted upon by vibrator 51 to remove excess powder. Then the rug passes through the curing ovens 52 and 53 where the applied urethane powder is set and fused. As the rug flexes over the roller 54, it is subjected to a rotary brush or comb 56 to remove oversize bubble-like clumps and break apart attachments of tufts or piling.

The properties obtained by application of a urethane type of coating as just described depend on such factors as the particle size of the powder, the temperature of the product, the temperature of the particle and of the air in which it is dispersed, the temperature difference between the temperature of the product and the coating powder when the powder is being deposited, the velocity of suspending air, penetration of powder by impingement, the extent of agitation during or following depositing, and the amount of excess powder removed while the product is still cold.

In the procedures previously described, the surface of the object to be coated or finished receives one application of powdered material, and the character of the application and the nature of the characteristics imparted to the object are dependent upon control factors previously outlined. In some instances it is desirable to subject objects to two or more treatments whereby a greater amount of coating material is applied to produce characteristics which cannot be obtained from a single application. The several applications may be of the same material, or different materials can be utilized, providing they are compatible. Referring particularly to the use of powdered materials of the urethane type, it will be evident that by utilizing two or more applications, the amount of urethane resin applied to the object may be increased as desired. For example, an undercoat of a thermosetting resin may be applied to provide rigidity, body and volume to the fabric, and after curing, a top coat of a selected thermoplastic may be deposited to develop softness to the "hand." The resins used for the different applications may differ in characteristics, as for example, they may be of different contrasting colors.

In addition to utilizing two or more applications to obtain enhanced characteristics or special effects, the powdered material itself may comprise a mixture of two or more thermoplastic or thermosetting materials, provided the various materials are compatible in producing the results desired. Also the resin may be used with one or more additives, such as inert flock particles or the like.

In some instances the fabric or other object being treated will have finishing materials upon its exposed surfaces, resulting from previous treatment. Particular reference can be made to various sizing materials, such as are commonly used in the manufacture of fabrics. In general it is found that such previously applied coatings or finishes do not interfere with application of the present method, and in some instances they may be desirable to provide greater attraction between the filament surfaces and the applied powder.

As previously mentioned, my invention can be employed to make certain fabrics feel differently or like more expensive fibers. When surface filament protrusions of blow resins are formed on fibers, or when loosely bunched fibers are bonded together at points of contact to form a boxed-in effect, the voids make for thermal insulating properties characterized by warmth. A treated garment, and particularly a loose knit one treated with a blown resin, has added feel of weight, bulk, and a noticeable springiness. Hot ironing of tight woven fabrics with a predetermined amount of compression, and with a controlled quantity of powder attachment, can serve to produce compacting, a smooth soft exterior surface, greater stiffness, resistance to wrinkling, drape retention or ability to retain creases and formed shapes.

The attachment of filaments or fiber at points of intercontact, while simultaneously applying a resin to that surface of the filaments, is exemplified by treatment of untwisted strands or loose mats of cotton, rayon, nylon, or like fiber. After the low temperature application of a resin powder to such masses, and while retained under such conditions, the masses can be subdivided, deposited and molded. Assuming use of a resin with an inhibited activator, the temperature can be elevated (for example to 40° F.) for a short interval to develop adhesiveness whereby the resin particles are firmly attached to the filaments, and the filaments to each other at their contact points. Thereafter the temperature can again be lowered for storage, subdividing, handling, packaging or introduction into molds. Assuming that the masses are placed in cans or like containers at a low temperature (e.g., —20° F.), at a later time, then some additional cold resin powder can be added with agitation to effect its dispersion over the fiber. Another variation is to coat the filaments as described, make them while cold into a usable mat, bat or bandage shape, apply the mat to a desired form or shape, and then apply heat for setting. Again the filaments, after application of the cold powdered resin, can be stored for a brief period in refrigerated condition, and later applied with final application of heat for setting. An example of this is medical bandages or casts, which may be applied and set, for example, an hour or so after application of the resin. In this instance I may retain the very low temperature necessary (e.g., minus (40° F.) by packing the coated filaments with an abundance of pulverized Dry Ice which can be shaken out immediately prior to application of the filaments as a cast or bandage. This technique has obvious advantages where it is desired to coat the filaments in a sanitary equipped area and effect application on a patient at another time and place.

Aside from the use of the above exemplified urethane type of powder in the textile industry, it can be employed in the wood and paper industry for various effects. As with textiles, it may be used for coating of natural or manufactured cellulose fiber or pulp. Thus, a desired amount of the resin particles can be deposited on a dry (and with some resins moist) paper or wood filament web by exposing the web to airborne powder, after which the material is heated by exposure to hot air, to radiant heat, or by direct metal contact as bypassing around hot rolls, to flow and fuse and expand and set the powder particles. Here again the properties imparted are dependent upon various factors, including the amount of powder applied, temperature differentials, and the method employed for fusion and bonding. Molding of nonwoven filaments and pulp or cellulose particles can be performed as later illustrated.

The urethane type of material described above is characterized by use of both an activator for setting and a blowing agent. I have found that the blowing agent can be omitted, thereby retaining the adhesive and coating properties but omitting expansion. While such a nonexpanding mix may be usable and even desirable in some instances, I consider is preferable to incorporate the blowing agent where practical, whereby the particles may be expanded beyond their original size before final setting. According to my observations, certain blowing agents, like Freon, may aid in conditioning the resin for depositing and flowing or expanding over filament surfaces when fused under heat.

Foam systems other than fluorocarbon blown polyethylene type polyurethane can be employed. Such systems may comprise many of the basic types of foaming resins currently of commercial importance, including cellulose acetate, epoxy, phenolic, polythene, polyester, silicone, urea, polystyrene, vinyl and various latexes. The critical factor affecting their use by this process is the ability to compound them so that they will become brittle when reduced to a low temperature. The following are examples of blown and/or activated resins: Rigid Urethane supplied by Reichhold Chemical Co., Flexible Urethane supplied by Polytron Corporation, and Vinyl Chloride as Pliovic AO foams (compounded per instructions from Goodyear), thermosetting resins and latexes, both with and without blowing agents, as supplied by Naugatuck Chemical Co., Division of U.S. Rubber Co. (e.g. Naugetex 2725 and Lotol LX497T, and Celogen AZ-Dop Paste), and latex emulsions.

In the foregoing I have described how various finely divided finishing powders are applied to various surfaces. After initial application and before temperature elevation some degree of retention is desired to prevent any substantial amount of reorientation or its removal when the object is shaken or vibrated to remove excess powder. According to my observations, sufficient initial retention is present when the surfaces are at a temperature level above that of the deposited powder. Care must be taken to avoid a temperature level of the surfaces which promotes an uneven deposit or the formation of deposited aggregates. Optimum temperature control may be readily determined for particular situations. By way of example, the surfaces may initially be at a temperature of from —20° F. to 0° F. where the powder has a temperature ranging from —20 to —50° F., with the temperature differential ranging from, say 20 to 50° F.

Figure 7:
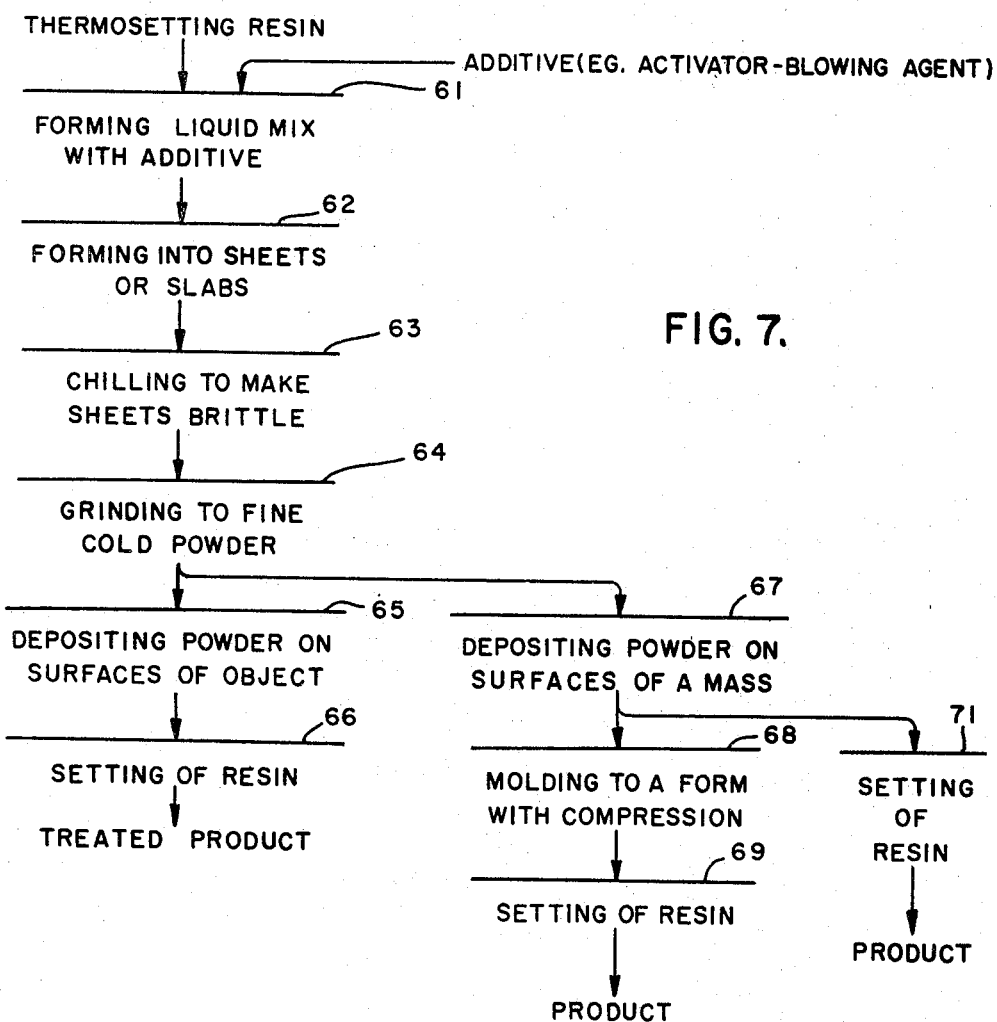
FIGURE 7 is a flow diagram illustrating application of my method to thermosetting resins.

FIGURE 7 is a flow sheet illustrating application of my method to certain thermosetting resins, as for example, the urethane type of resins previously mentioned. Step 61 represents mixing the resin in liquid form with additives, such as an activator, and also a blowing agent if it is desired that the resin be of the blown type. In step 62, the liquid resin is formed into sheets or strips which are then chilled in step 63, to the point of becoming quite brittle. The brittle material is then subjected to grinding at 64, thus forming a cold powder of small particle size. Step 65 represents the depositing of the cold powder upon the surfaces of an object to be treated, and step 66 represents setting or curing of the resin, which may be at ambient temperature or at an elevated temperature. Step 67 represents the depositing of the cold powder from 64, on filaments of a mass, such as a loose mass of cotton, wool, rayon, nylon, acrylic fiber and the like. Step 68 represents molding of the treated filamentary mass to a desired form with some compression. In step 69 the molded and compressed mass is set at ambient or elevated temperatures. Step 71 represents setting without the molding step 68.

Figure 8:
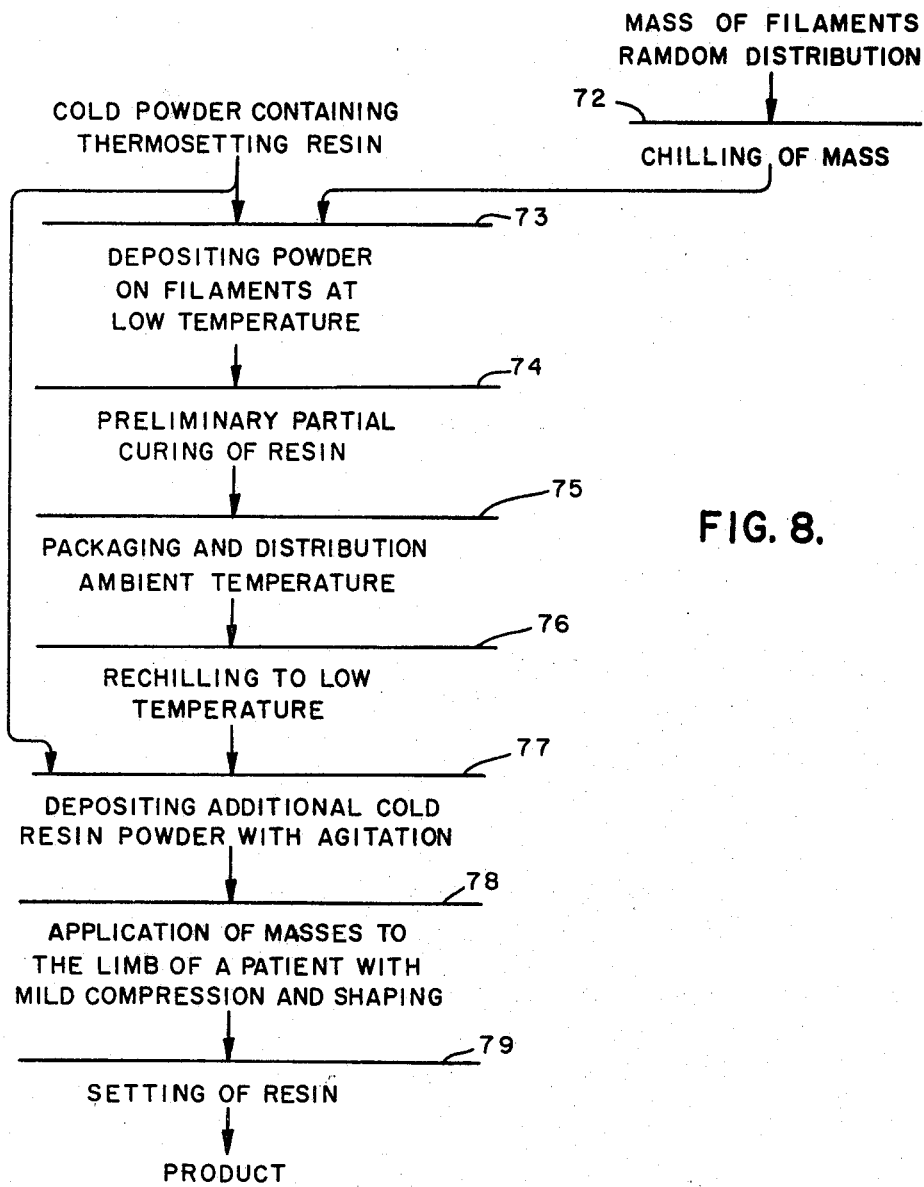
FIGURE 8 is a flow diagram illustrating my method of procedure in forming medical casts.

FIGURE 8 represents application of my method to form a medical cast. In this instance the cold thermosetting powder produced as in FIGURE 7 is deposited in step 73 on filaments of a loose mass, such as a loose mass of rayon or nylon filaments. The filaments are shown being prechilled in step 72, before the powder is applied. The resin is subjected to curing in step 74, thereby imparting springiness and resiliency to the mass. In step 75, the masses are packaged for storage and distribution at ambient temperature. Step 76 and subsequent steps represent what is done with the masses to form a medical cast. In step 76 the masses are chilled to a low temperature, and in step 77 additional cold thermosetting resin powder is deposited upon the filaments, together with agitation. In step 78, the cold masses (i.e., pads) are applied to the limb of a patient (human or animal) after the limb has been covered with gauze. This application is accompanied by some mild compression and shaping and by wrapping the exterior with suitable material, such as gauze. In step 79 the freshly applied resin is caused to set at either ambient or elevated temperatures. Setting is accompanied by a fixing of the desired form and with a bonding of the individual pads together. Thereafter the exterior gauze can be removed, leaving a smooth surface of the filamentary mass. As pointed out in certain of the appended examples, this forms a desirable medical cast which is porous but which provides sufficient support for medical purposes.

Figure 9:
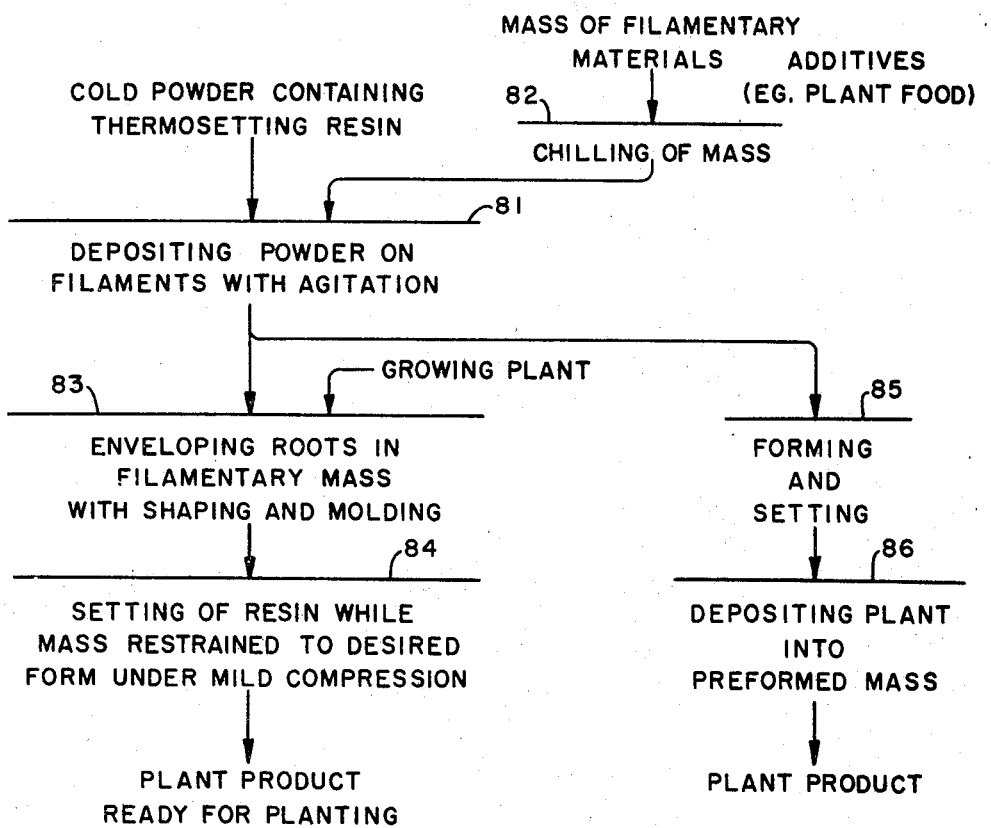
FIGURE 9 is a flow diagram illustrating application of my method to the packaging of growing plants.

The flow sheet of FIGURE 9 represents application of the method to the packaging of growing plants, such as may be sold as nursery stock. In this instance the cold powder of medium or high density thermosetting resin may be prepared as in FIGURE 7. In step 81 the powder is deposited upon a loose mass of cold filaments from step 82. The material may be rayon, cotton linters and textile waste waste materials, jute, etc., separately or mixed. In step 83, a growing plant, with some soil attached to its roots, is enveloped within the treated filamentary mass, with some shaping and molding. In general, in this step the filamentary mass is shaped about the roots to envelop or form an enclosure, which may simulate a pot or box. In step 84 the filamentary mass is held to a desired form under mild compression. This may be carried out by placing the mass within a confining enclosure, such as a bag or the like. Setting occurs while the mass is so restrained, the setting being either at ambient or sufficiently elevated temperature to accelerate setting without injury to the plant. The final product is a plant which is packaged for sale, the plant having a resilient protective enclosure for its root system, which takes the place of or is supplemental to a pot, and which is moisture absorbent, light in weight and free from escaping dirt. The enclosure (which may be partially cut open at time of planting) can be placed directly in the soil with the plant.

As another embodiment of the application described, I have found it practical to encapsulate plant roots and soil in a loose web of filaments, and package in a bag, after which I deposit the cold powdered resin in the bag, agitate the bag to settle the resin into the filaments, and then effect compression by packaging in a confining carton with setting developing in the package.

In the packaging of plants as described above, selected plant food like redwood leaf mold may be incorporated in the filaments before molding and the urethane will fixate them in place with only partial coating, thus retaining their food use. Another method is to preform "batts" with a centrally spaced opening (step 85 of FIGURE 9) in which plant roots can be slipped in and their stem vertically supported by compression from side walls of the batt, as indicated by step 86.

Some coating operations are more difficult than others. For example, a coating material which will adhere readily to one type of fabric may readily peel off and separate from another fabric. In a stubborn case such as this, the above described process is modified to obtain a tight bond between the coating material and the object to be coated.

Figure 10:
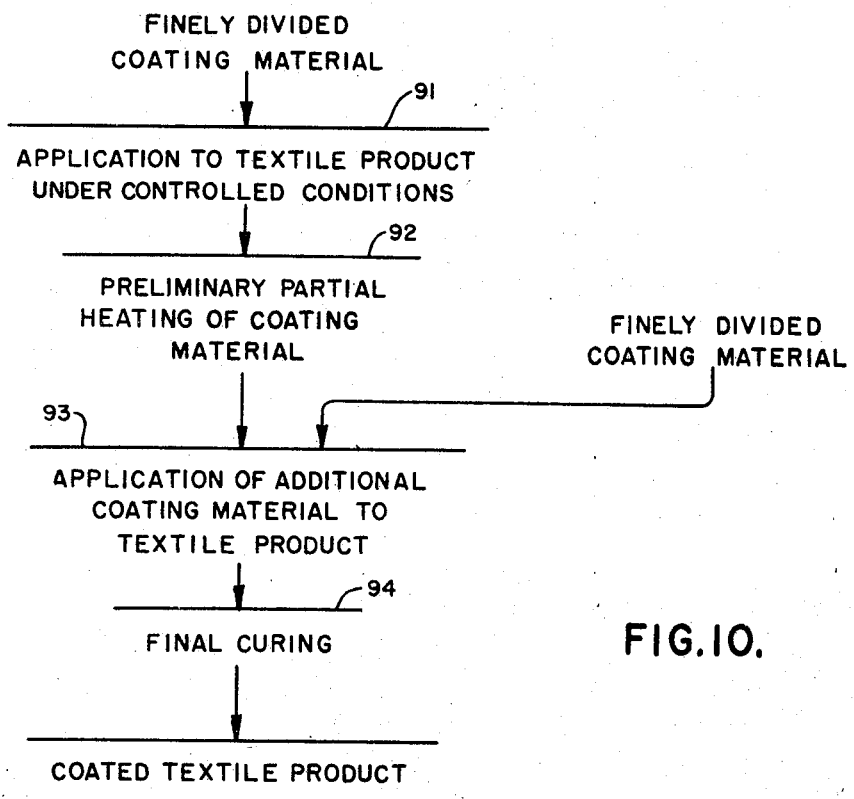
FIGURE 10 is a flow diagram illustrating the procedure following in obtaining a heavy coating on textile products which are difficult to coat.

FIGURE 10 illustrates a procedure which can be followed to obtain a good bond in difficult cases. A first amount of the coating material in powder form is deposited on the fibrous product in step 91 in accordance with the above described procedure. The object is then exposed in step 92 to a temperature which is sufficient to soften the coating material. As soon as the coating material softens, a second amount of the coating material is deposited in step 93 on the product. The product is then exposed to an elevated curing temperature in step 94.

To be more specific, it is, for example, difficult to obtain a good bond when coating a nylon taffeta with polyvinyl chloride (PVC). In this case, the PVC is dissolved in a plasticizer of a well known type to form a thick paste. This paste is then cooled to and reduced to a very fine powder in the manner described above. An amount of this powder is deposited, at about 40° F., on the agitated nylon taffeta fabric. The coated fabric is then exposed to a temperature above the freezing point of the paste to soften the powder particles clinging to the fabric, and then a second amount of the powder is similarly applied. The fabric is then subjected to a temperature sufficiently high to cure the powder and form a uniform coating on the fabric.

My invention can also be used for the packagaing of growing plants, such as may be sold as nursery stock.

It will be evident from the foregoing that my invention and its various applications fall within a number of subdivisions. One particular subdivision is the coating of various materials, includng filamentary objects and particles. Another subdivision is the making of filamentary masses into forms and shapes by a procedure involving attachment of filaments at their points of contact, the contact points being multiplied by controlled compression during setting of the applied resin. My invention has a wide range of application to produce a variety of new products. A brief enumeration of some of the new products is as follows:

Woven (fabrics) and unwoven (e.g., felted) products made of natural and synthetic fibers or filaments with the fibers or filaments having thermoplastic or thermosetting material applied thereto.

Products in the form of masses of fibers or filaments, such as new medical casts and bandages that afford more protection with lighter weight, resiliency and passage of air to covered areas.

Tufted carpets and carpet backing that provides cushioning, dimensional stability and resilient thickness coupled with added visual appeal and the feeling of greater body to the carpet.

Loose filamentary masses of natural or synthetic filaments (e.g., bats of cotton, rayon, excelsior, jute, etc.) which have added strength and resiliency, and which can be used for upholstering, filter pads, packing, cushioning and the like.

Growing nursery root stick encapsulated as described above has a number of advantages. The filaments when wet do not collapse or lose their shape or volume, and they provide insulation, warmth, protection and support to the roots. When planted some roots can eventually grow into and through the filaments. To effect more rapid or selected areas of growth it is a simple matter to break apart openings in the filaments prior to planting. Nursery products packaged in this manner can be packaged without, or with a minimum of, soil. This is a desirable feature, coupled with the unusually light weight of the packaging with respect to its volume, and the number of plants it can effectively support and economically distribute. For the retail nursery and the consumer, loose dirt and mess is minimized and final planting is achieved without disturbing the root structure.

Another embodiment of a nursery package is the preparation of a so-called "batt" which may be shaped in size and contour to be an insert for a flower pot. The batt having a precast slit or an opening in the center wherein a "slip" or rootstock can be inserted and the yieldable compression of the resilient filaments will retain it tightly and in erect posture. This "batt" can contain one or more nursery plants with either no or a minimum amount of attached soil, and can be shiped through wholesale channels. The retailer can merchandise this product to be later potted or planted by the consumer, or the retailer can insert the molded "batts" into a pot. Features of this embodiment are the light weight in transit, the access to food and water that can be incorporated or added to the filament voids, the handling by wholesaler and retailer without mess or free soil and the final attractive visual and neat packaged plant for the consumer. I have discovered that plants thrive when so encapsulated, in many instances with no soil or a minimum of soil.

In addition to applying the invention to fibers and filaments of the types previously mentioned, the invention can be applied to relatively coarse fibers or filaments such as shreds or filaments of natural wood (cog., excelsior), paper, woven or unwoven paper shreds, wood bark, wood shavings or chips, moss fiber, and the like. Particular reference can be made to redwood bark filaments. After applying the resin powder at a low temperature to such material, a mass of the material can be compressed in a mold, and while in the mold the material is heated to ambient or higher temperature to effect expansion of the resin and curing. The resulting porous product retains the shape imparted to it during molding, and consists of wood shreds having expanded resin nodules attached to its filaments, including nodules or protrusions of resin which bond the fibers together at points of contact.

Compressed pots formed of filamentary material can be made of such materials as redwood bark filaments, wood chips and moss fiber, as well as from other attachable filaments, like cotton linters, waste fiber, nylon, rayon and jute. They have a particular merit besides providing insulation with thick moisture-retaining side walls, in that they provide for controlled passage of air to the roots, which appears to accelerate growth, and provide good drainage.

In the foregoing I have referred to products formed of various fibers or filaments, with protrusions of cured resin that are preferably blown. However the same resin powders can be applied to advantage to the surfaces of other products. Particularly agricultural seeds can be treated to effect deposition of the powder on the exterior seed surfaces, followed by attachment of the resin and its expansion and curing. The resulting seed is enlarged in size and is therefore more readily handled in seeders and like equipment. The blown resin does not interfere with germination. Fertilizer pellets can also be coated in the same manner to provide a larger leaching period. Also insecticide pellets (e.g., containing inert matter plus DDT) can be coated in the same manner to provide longer shelf life.

In instances where difficulty may be encountered in causing initial adherence between the powder particles and the surfaces on which they are deposited, the powder particles immediately before deposition can be passed through a high temperature region to flash heat their outer surfaces, thus making the particles sticky. The high temperature region may be the flame of burning fuel gas through which the particles are passed for flash heating.

Examples of my invention are as follows:

EXAMPLE 1

A good quality of microcrystalline paraffin wax was selected having a melting point of about 150° F. The wax was melted by heating to about 350° F., and then it was supplied to a pressurized spray gun of the paintspray type. The atomized particles, as delivered to air at 30° F., dropped upon a collecting surface as individual spheres and sphere fragments, having a particle size ranging from 3 to 30 microns. A quantity of this powder was placed in a bowl, chilled to minus 20° F., and agitated by a high speed agitator of the Waring type. The bowl was dimensioned to closely confine the material about the agitator. Under such conditions of agitation and low temperature, the individual powder particles were deflocculated. A quantity of this deflocculated powder was spread uniformly over a piece of cotton yardage. During such application the cotton cloth was agitated to effect some settling of the powder into the substrate cotton surfaces. Such direct contact with the cloth was continued for a period of about 15 seconds. Thereafter and before any substantial flocculation occured by virtue of increase in temperature, the cloth was gently shaken to remove excess powder. A hand iron at 300° F. was then applied to the cloth on the coated side, whereby the wax particles were melted and caused to flow over the wax contacted cotton filaments. After such treatment the cloth was found to be water repellent, although the general appearance of the cloth had not been altered. The water repellency was not resistant to conventional laundering or dry cleaning.

EXAMPLE 2

The procedure was generally the same as in Example 1, except the cotton yardage was precooled to 20° F. before the wax was applied. This served to reduce surface clinging and flocculation of particles on exterior surfaces, and to give a better penetration of powder into substrate regions. The precooling minimized heat transfer from the fabric to the initial clinging particulates so that they did not turn warm to such an extent as to attract particles to them. Thus was attained a desired pattern of dispersion of a single layer of clinging particles to the fiber surfaces. Heat was applied to cause the wax to flow and fuse as in Example 1.

EXAMPLE 3

The paraffin powder produced in accordance with Example 1, after being chilled to minus 20° F. was placed in a precooled (—20° F.) hammer mill of the Fitzpatrick Type which was so situated in a room at —20° F. whereby in operation it drew in air at the corresponding temperature. The rotor of the mill was driven at 3600 r.p.m. and the mill employed a 40 mesh screen surrounding the rotor. The discharge of this mill comprised air impelled wax particles widely and individually dispersed in an airstream of some velocity effecting an inpinging action on exposed surfaces of cotton cloth placed just under the mill discharge outlet. A suction hose connected between the inlet of a suction blower and a perforated suction head disposed immediately below the cloth. Powder removed by the suction head, together with powder removed from the cloth by agitation, and powder not directly applied was recooled and returned to the mill. Agitation of the cloth (while cold) following its passage over the suction unit further settled and distributed the powder particles into substrate regions.

EXAMPLE 4

The procedure was generally the same as in Example 3. However, a quantity of pulverized Dry Ice (solid $CO_2$) was introduced into the mill together with the wax powder, in the ratio of 3 parts (by weight) of Dry Ice to 1 part of wax. The Dry Ice functioned to reduce the temperature of the powder and to hold it at a desired low temperature level. Also it served as a deflocculating and dispersing medium for the wax powder. The powdered wax was deposited on a cloth placed below the outlet of the mill, after which excess powder was removed by shaking.

EXAMPLE 5

The procedure was generally the same as in Example 4. However, in addition to adding Dry Ice to the wax powder in the mill, there was added an amount of water ice in pulverized form, the proportions being 1 part of wax, 3 parts of Dry Ice, and 2 parts of water ice. The presence of ice improved the deflocculating and dispersing action. This airborne powdered mix provided improved penetration into substrate regions of the cloth, which I attribute to the more effective deflocculation, and to the character of the ice particulates. After an application to cotton cloth, and after excess powder was removed by shaking, application of a hot iron at 250° F. served rapidly to remove the Dry Ice and water ice by vaporization, and to fuse the wax and cloth to flow together and bond to the cotton filaments.

EXAMPLE 6

The procedure was generally the same as in Example 5. However, the use of Dry Ice was omitted and the wax powder and the water ice were intermixed and introduced into the mill in the proportions of 1 part wax to 4 parts of water ice. The mill was precooled to —40° F., and this temperature was maintained during subsequent grinding and application of the powdered mix to the cloth. This powdered mix was applied to the cotton cloth in the same manners as described in Examples 1, 2 and 3. Thereafter the cloth was pressed with an iron at 250° F. It was found that the powdered water ice used in this manner was quite helpful in deflocculating and dispersing the wax powder and in obtaining the desired penetration into substrate regions of the cloth.

EXAMPLE 7

A quantity of powdered paraffin wax was produced in accordance with Example 1. A quantity of this powdered material was introduced into a body of water at ambient temperature and agitated by use of a Waring Blendor. The proportions were 10 grams of wax powder to 1 pound of water, this water at the beginning being at 55° F., and at about 80° F. at the end of the mixing period. This mix of wax particles and water was deposited on a filter membrance and excess water permitted to drain away. The remaining wet mass comprised about 1 part by weight of wax and ½ parts by weight of water. This mass was frozen to —20° F. and introduced into a high speed hammer mill, where it was ground to a fine powder comprising a mixture of the wax powder particles and water ice. This powder was then used in the same manners as described in Examples 1 to 3 inclusive. It was found that this type of powdered mix was somewhat more effective than the powder mix produced in accordance with Example 6, which I attribute to the incorporation of water as an enveloping lyosphere about wax particles, before freezing. Also according to my observations, the ground material described in this example comprised wax particles coated with ice, together with free ice particles. Wax particles coated with ice appeared to be better adapted for ready penetration in the substrate regions, presumably due to the fact that surface attraction and friction effects were minimized.

All of the foregoing Examples 1 to 7 can be repeated with good results by the use of paraffine or like wax produced in powdered form by other procedures, as by grinding paraffin wax at a low temperature.

EXAMPLE 8

A clear thermoplastic vinyl resin was employed having wax like characteristics and sold under the name of Elvax (made by Du Pont). Six ounces of Elvax was melted and mixed with 18 ounces of a paraffin-polyethylene blend manufactured by Paragon Wax Co. of San Francisco, and sold under the trade name of Super Glaze. This latter material is reputed to contain 80% micro-crystalline paraffin wax, and 20% polyethylene. These two ingredients were melted and blended together to give a wax-like thermoplastic having a melting point of about 150° F. This blend, at a temperature of about 300° F. was applied to a spray gun of the pneumatic paint type manufactured by Spraying Systems, Inc. of Bellwood, Ill. A pneumatic pressure of 40 p.s.i. was applied to the gun, with an acetylene flame playing against one side of the nozzle to prevent clogging (i.e. die facing). Cobweb-like filaments were formed when the material was sprayed into air, with the air at a temperature of about 30° F. The filaments were about 0.6 to 6 microns in diameter. About 10 grams of such filaments were gathered as a mat and introduced into 1 pound of tap water in a Waring Blendor type of disintegrating mill. Agitation at high speed was carried out for 5 minutes, with the water temperature commencing at 55° F., and gradually increasing to 76° F. In this preliminary wetting and disintegrating operation the filaments are broken into pieces averaging between about 123 microns to 3 mm. in length. Also the filaments were subjected to violent agitation in water. At the end of this treatment the contents were deposited on a 32 mesh screen, and free water permitted to drain from the slush-like filament mass. The remaining mass comprised 47 grams of water and the original 10 grams of thermoplastic material. This wet mass was then sheathed ⅛ inch thick, made brittle by cooling to —40° F., and introduced into a rotary hammer mill having its rotor operating at 3600 r.p.m., and having a 40 mesh screen about the rotor. The hammer mill was located in a cold room in which the temperature was slightly below 0° F. The finely powdered material passing through the 40 mesh screen had a particle size of the order of 9 to 90 microns and the individual particles when viewed in a miscroscope with 400X magnification were elongated or needle-like fragments of the rod-like material entering the hammer mill. A substantial amount of ice remained intimately associated with the particles, and in some instances appearing to envelop the particles. In general the powdered mix was free flowing without tendency to form aggregates or agglomerates. The powder produced in this manner was continuously recirculated through the hammer mill and the discharge from the lower outlet of the mill used as a powder dispersion to deposit powder upon objects. Three sweaters of the bulk knit variety were precooled to 0° F. and each sweater slowly passed underneath the mill to receive the powder. Each was subjected to the dispersed powdered particles for about ¼ minute. The sweaters were agitated manually and inverted to expose all surfaces to the powder. One of the sweaters was made of wool, the second of an acrylic fiber (Orlon) and one was made of cotton. After application of the powder to each sweater, the sweater was gently shaken to remove excess powder, before there was any opportunity for the particles to flocculate or melt. Thereafter all three sweaters were introduced into ovens at an air temperature of 250° F. for the cotton sweater and 225° F. for the wool and Orlon sweaters, and permitted to remain for 30 minutes. Heat served to drive off moisture and to flow and fuse the powdered coating material upon the fibers. All of the sweaters treated in this manner were water repellent, and in the case of the cotton sweater, this property was improved with laundering. In each instance there was no visible change in the appearance of the cloth, and it was observed that the fiber of the yarn still retained its initial physical identity without visible changes in volume or density. The weight and body of the cloth remained substantially the same, with the exception that they had a softer feel and an appearance of warmth. Careful examination of the cloth revealed that the thermoplastic coating material had fused and flowed to form films upon the fiber surfaces. Also it revealed that the coating was relatively uniformly dispersed throughout the cloth, including substrate regions as well as exterior surfaces.

EXAMPLE 9

The procedure was the same as in Example 8. However, a non-ionic and foam forming wetting agent, manufactured by Carbide and Chemicals Corporation (Tergitol TP9) was incorporated in the water in the Waring Blendor. About 3 drops of Tergitol TP9 were introduced for each pound of water. The resulting foam formation served substantially to increase the volume and to suspend the particles like an emulsion. The foamed mass was frozen and finely ground in a hammer mill at —20° F. to produce an unflocculated powder suitable for application to bulky fabrics. Another sample of the same was subjected to drainage to produce a mass comprising 10 grams of thermoplastic wax and 59 grams of water. After freezing and grinding the resulting powder was of a character suitable for depositing and settling into cotton yardage. The detergent appeared effective in promoting free flowing properties at low temperature.

EXAMPLE 10

The procedure was the same as in Example 8. However, 5% by weight of gum arabic was added to the water in the Waring Blendor and dissolved, prior to adding the thermoplastic. The final ground powder was quite free flowing at —40° F. According to my observations, the particles retained some of the gum frozen as a hard gloss-like surface agent, which aided in maintaining dispersion.

EXAMPLE 11

The procedure was the same as in Example 8, except that 2 ounces of water-free lanolin was added to the wax and Elvax. The lanolin content served to impart an unctious feel to the finished fabrics. Its effect was particularly noticeable when applied to bulk knit cotton and acrylic sweaters. The lanolin seemed to acelerate clinging of particulates to the garment, thus indicating that other compositions may be similarly modified to develop predetermined thickness of application.

EXAMPLE 12

The procedure was the same as in Example 8. However, instead of using the three sweaters described, pieces of wool and cotton yardage were employed. The exposed surfaces of the yardage were precooled to 5° F. and the application of the powder was carried out substantially as in Example 4. It was noted that the more compact yardage material was not penetrated to the same extent as the knit goods, and, therefore, the amount of powdered material retained by the yardage was somewhat less. By application of a pneumatic suction head to the under side of the cloth, just below the depositing area, penetration of particles into substrate regions was improved. Subsequent tamping of the fabric caused additional particle distribution within the substrate regions.

EXAMPLE 13

The same procedure was employed as in Example 8. However, instead of maintaining the low temperature level of 0° F. the operations were carried out with the objects at a temperature level of the order of 40° F. While relatively good application of the powder was obtained, it was noted that the substrate regions were not as effectively treated as when using the lower temperature specified in Example 8. Also surface particles tended to flocculate at various points causing uneven concentrations of wax in the fabric.

EXAMPLE 14

The procedure was the same as in Example 8, except that a sheet of absorbent paper was coated. After being subjected for a period of about 15 seconds to the dispersed thermoplastic powder discharging from the hammer mill, the paper was pressed with a hot iron to simulate processing in a calendering roll. The property of water repellency was imparted to the paper, without noticeably changing the appearance, texture or stiffness.

EXAMPLE 15

The procedure was the same as in Example 8. However, instead of using Elvax, I substituted Pliolite No. 50 Milled, manufactured by the Goodyear Tire & Rubber Co. Also I added to the thermoplastic mix 1 ounce of Aroclor No. 1268, manufactured by Monsanto Chemical Co. The results obtained were substantially as stated in Example 8. However, it was noted that the Aroclor content made a whiter wax mix, and also added pliability and a softer feel and appearance to the final product.

EXAMPLE 16

One ounce of fluorocarbon No. FC205, manufactured by Minnesota Mining & Manufacturing Co., was dissolved in water in the proportion of 1 ounce of the fluorocarbon for each 6 ounces of water. This aqueous solution was then used in place of plain water in Example 8. The wet partially disintegrated mass, containing the Elvax-wax particles, was frozen to −40° F. and the frozen mass passed through a high speed hammer mill of the type referred to in Example 8, thereby producing a fine powder comprising ice having the wax-like thermoplastic and the fluorocarbon uniformly distributed therewith. This was applied to precooled cotton yardage in the manner described in Example 8, and thereafter excess powder removed by shaking and the yardage heated in an oven to 250° F. Heating served to vaporize off remaining moisture, and to cause the resin to fuse and set, thereby imparting salad oil and water repellency. Salad oil repellency was present in contrast to a similar garment coated in the same manner with a silicone type resin, which imparted water repellency without being repellent to salad oil.

EXAMPLE 17

A solution of fluorocarbon in water was prepared in the same manner as in Example 16. This solution was directly frozen and hardened without other material, and thereafter the frozen material at −20° F. was ground to form a fine powder. This powder was then applied to cotton yardage in the same manner as in Example 8. Excess powder was removed by shaking and then the yardage was heated to 300° F. in an oven. This served to remove residual moisture and to set the fluorocarbon. Water and oil repellency was imparted to the material.

EXAMPLE 18

The procedure was the same as in Example 8. However, instead of the Elvax content, I substituted a blend comprising 30% butyl rubber, and 70% microcrystalline paraffin wax. The filaments were formed and processed as in Example 4, and the resulting finely divided powder was used as described to treat blouses made of acrylic fiber.

EXAMPLE 19

A clear thermoplastic synthetic resin was employed, sold under the name of Pliolite Milled 50, and manufactured by the Goodyear Tire & Rubber Co. Nine (9) ounces of Pliolite was heated to 300° F. and mixed with 18 ounces of melted microcrystalline paraffin wax, having a melting point of 138–140° F. 1 ounce of Aroclor No. 1268, manufactured by Monsanto Chemical Co., was added to the wax blend. The purpose of the Aroclor was to whiten the wax, soften it to the feel when applied and increase its adhesion. This wax blend, at 350° F. was placed in the container of a conventional pressurized spray pint gun manufactured by the DeVilbis Company, and was atomized into a cold chamber having an air temperature of 30° F., with the temperature of the air supplied to the gun being at 70° F. and utilizing an air pressure of 50 p.s.i. upon the wax. An acetylene flame was played against the side of the nozzle to prevent die facing. Filaments were produced having a diameter of about 0.06 to 10 microns. These filaments were caused to fall directly into a mass of agitated water in a Hobart mixer, the water being at a temperature of 35° F. Thereafter this wet mix was transferred to a Waring Blendor type of mill, and in the blender there was added 5% solution of gum arabic. The proportions in the Waring Blendor were 10 grams of thermoplastic filaments to each 8 ounces of water. The material remained in the Waring Blendor for 3 minutes, after which the material was deposited upon a 30 mesh screen for draining. This wet slab was then rapidly frozen to a temperature level of about −40° F. The frozen mass was broken into flake-like fragments, each about 1/16 of an inch thick, and of the order of 1 inch in diameter. These flakes at a temperature of about −50° F. were introduced into a hammer mill of the Fitzpatrick type, with a rotor being driven at 3600 r.p.m., and with a 60 mesh screen surrounding the rotor. The hammer mill was located in a cold room at a temperature of 0° F. The powder passing through the 60 mesh screen was collected and permitted to thaw. The wet powder was then centrifuged in a centrifuge basket of the Braun type, and the remaining thermoplastic solids dried in an oven at 120° F. for 4 hours. Upon microscopic examination it was observed that thin films of gum arabic enveloped the thermoplastic particles. Comparison with thermoplastic powder obtained by following the same procedure, but without using the gum arabic, revealed that the gum arabic containing powder was more free flowing and possessed less tendency to agglomerate or clump. This dry powder was successfully used in the ways specified in Examples 1 to 7, inclusive.

EXAMPLE 20

The procedure was generally the same as in Example 19. However, as the filaments discharged from the spray gun, they were received in cold air whereby they were solidified, and they were permitted to settle onto a fluidized bed of pulverized water ice at a temperature of −20° F. The filaments and ice were agitated and intermixed together, whereby the filaments were broken into shorter lengths. A mix prepared in this manner, containing one part by weight of Pliolite filaments to 10 parts by weight of water ice, was ground in a hammer mill of the Fitzpatrick type, having a 40 mesh screen about the rotor. During grinding the temperature of the mill was maintained at about −20° F. This served to produce a powder mix comprising particles of water ice, together with generally elongated particles of Pliolite. The Pliolite particles were of a length somewhat less than 48 mesh, and a thickness ranging from about 3 to 30 microns. This powdered mix was used for finishing fabrics, by application procedures as previoulsy described, including particularly the procedure described in Example 8.

EXAMPLE 21

The thermoplastic employed was Rein NC11 made by Hercules Powder Company. It was ground and classified to −200 mesh. 8 ounces of water was placed in a Waring Blendor, together with 1 gram of Tide. After about 1 minute of violent agitation the water was foamed to about three times its original volume. The powdered resin was then added to the foamed water. Agitation in the Waring Blendor was continued for about 15 seconds to disperse the resin without material dissolution. The entire mass was then frozen to −40° F., and the frozen material fed to a hammer mill and ground to −200 mesh particle size. At a temperature of about 0° F., this powder was sifted upon absorbent precooled paper, the paper being at about 30° F. Excess powder was gently removed by shaking, and then a sample of the paper was placed in an oven at 200° F. Moisture was removed in the oven, and the powder fused.

EXAMPLE 22

The procedure was the same as in Example 21, except that the mixing period in the Waring Blendor was extended from 15 seconds to 10 minutes. At the end of that time it was noted that the thermoplastic powder was dispersed to form a clear emulsion. 2% of gum arabic was dissolved in the emulsion to provide greater pliancy. The remainder of the procedure was the same as in Example 21. When applied to cotton yardage, water repellency was imparted.

EXAMPLE 23

A liquid latex material was selected, namely, Pliovic type AO, made by Goodyear Tire & Rubber Company. This was blended in equal proportions with a plasticizer, namely Flexol plasticizer No. 810, made by Carbide & Carbon Chemical Company. These two materials were blended for 1 minute in a Hobart mixer. This mix was chilled, subdivided and frozen by contact with Dry Ice in flake-like form, and then supplied to a high speed hammer mill together with Dry Ice in the proportion of 10 parts of Dry Ice to one part of rubber. The resulting powdered material was deposited directly on cotton yardage to −10° F., and a substantial amount of the dispersing air was caused to flow into and through the fabric. At the conclusion of the application the yardage was gently shaken to remove excess powder, and then it was placed in an oven heated to 300° F. for 10 minutes. This served to fuse the latex powder particles and thereby impart rubber-like preparation to the fabric. Water repellency was imparted and a rubber-like feel to the material, without however changing the normal pliancy and desirable character. These properties appeared to be relatively resistant to conventional laundering and dry cleaning. This example was then duplicated with ¼ of the Flexol substituted by a product made by Naugatuck Chemical Co. comprising a compound containing celogen as the blowing agent and marketed as Celogen AZ-DOP.

EXAMPLE 24

A fluorocarbon blown polyether type polyurethane foam system was employed. This involved use of two liquid ingredients intermixed together. One ingredient was known as 92–322 Polylite, and the other as 92–332 Polylite, both made by Reichhold Chemicals Inc. The ingredients were intermixed in the proportions of 100 parts by volume of the 92–322 Polylite, and 90 parts by volume of the 92–332 Polylite. Both ingredients were about 40° F. After blending the two ingredients for a period of 1 minute in a Hobart mixer, the mix was spread on a flat chilled metal surface to a thickness of about ⅛ inch. During a period of about 1½ minutes, during which the material was mixed and spread, there was an increase in volume of not more than twice that of the original mix. At the end of this period the sheet was quickly chilled to a low temperature by placing it in contact with a sheet of Dry Ice. The rapid freezing served to arrest further reaction between the ingredients, and produced a very friable brittle material. This material was then ground in a high speed hammer mill having a 200 mesh screen, together with an amount of Dry Ice in the proportions of 1 part urethane to 5 parts of the Dry Ice. It was observed that the Dry Ice tended to remain at a particle size greater than 200 mesh, whereas the urethane readily ground to a fine powder and passed through the screen. Samples of a loose knit cotton carpet and a rayon carpet precooled to −10° F. were placed under the discharge from the hammer mill, whereby the fine airborne powder from the hammer mill deposited upon the carpets. While the powder was being deposited the carpets were flexed around a ¼ inch rod which opened the tufts as they passed around, allowing the urethane particles to be deposited well into the substrate region. Agitation of the carpet immediately followed for better dispersion and to remove excess powder. Final shaking while the carpet was still cold and reversal of the run so that the tufted side was faced down, removed excess powder, after which the carpet was removed from the low temperature area and allowed to return to ambient temperature. It remained at ambient temperature (90° F.) for 2 hours, during which time most of the expansion of the powder occurred. It was observed that in certain spots clumps of powder had expanded to form visible balloon-like masses. These masses were not firmly attached and were removed by combing. During the early period, and while the urethane was still in the frangible preset stage, the carpet was flexed about a rod a number of times to break apart any adhering tufts. Although carpets were coated with or without their final backing, it was observed that the coating was more effective, and the flexing operation more effective if the backing had not been applied. Brushing was applied in the flexed region and was found effective to separate any adhering strands. With a magnifying glass it was observed that a substantial amount of the fine powder particles prior to complete setting were distributed upon the fibers of the carpet and were expanded. Setting was completed by storage at ambient temperature. Water repellance was imparted to cotton and rayon carpets, and in addition some noticeable changes were imparted. The cotton carpet did not mat like an ordinary cotton carpet, but was springy and resilient. In general, cotton carpet felt like it was made of more expensive synthetic fibers. The small fused masses of urethane adhering to the yarn appeared to have possibilities of providing soil retention without contact with the cotton. I attribute this to the multiplicity of pockets and eruptions on the surfaces of the yarn and filaments which seem to hold the dust, as well as by the coating of urethane itself. The hardened urethane coating appeared to impart greater wearability to the rayon carpet and to alter its slick feel, the latter being a factor that can be controlled by modifying the compounding of the resin and by adding a further finish coat.

The foregoing Example 24 was repeated except that after depositing of the powder the carpet was agitated to distribute the applied amount over the exposed surface areas and then it was placed in an oven at 250° F. air temperature. After 5 minutes the carpet was combed while being flexed over a draw bar, to separate the tufts from sticking to each other and to comb out any bubbles of resin before they set and become affixed. This process was repeated after 12 minutes and after 20 minutes in the oven. The total time in the oven was about 30 minutes. This set the urethane quite hard, with further hardening occurring during subsequent storage at ambient temperatures. By this technique the development of irremovable bubbles of urethane, or undesired attachment between tufting, was essentially eliminated. The rapid application of heat with attendant brushing and combing seemed to flow or distribute the urethane so that a smoother feeling finished end product resulted.

EXAMPLE 25

A fluorocarbon blown polyether type polyurethane foam system was employed as described in Example 24. However, after immediately mixing the component ingredients, they were deposited as a flowable mass on a cold plate whereby the mix was quickly cooled to a temperature of —40° F. This produced a brittle slab about ¼ inch thick, which was relatively stable with respect to its activator and blowing agent. The volume increase compared to the volume of the initially intermixed ingredients, was less than 50%. The brittle slab was broken up to produce coarse brittle flakes which were then introduced into the chilled bowl of a Waring type agitator. The bowl of the blender was dimensioned to closely confine the material about the rotor. Within a period of about 10 seconds the brittle flakes were reduced to a fine powder. At temperature levels of the order of —40° F. this powder remained in deflocculated form. The powder was deposited on prechilled fabrics (0° F.) contained in an enclosed bag, and the bag and contents agitated to disperse the powder over the fibers of the fabric. The deposited particles expanded and fused by heating in an oven to a temperature of 250° F. The resulting finish appeared to be resistant to conventional laundering or dry cleaning.

EXAMPLE 26

Brittle urethane sheets were formed in the same manner as in Example 25. These brittle sheets were then fed to a hammer mill having means for continuously recirculating the discharged powder. The powder readily passed through a 200 mesh screen about the rotor of the mill. The equipment and the circulating powder were maintained at a temperature level of about —40° F. Some Dry Ice was added to the mill to serve as a refrigerant, and it was observed that the Dry Ice particles largely remained of such size that they did not pass through the screen. However, some of the particles of Dry Ice were converted to the gaseous phase as heat was absorbed. Using the airborne discharge of powder from the mill, before recirculation of the powder, this was directed upon a mass of cotton filaments (precooled to 0° F.) in the form of a loose mat (i.e. lap) about 1 inch thick. The air discharging from the mill was permitted through the mat. After a few seconds of such application, excess powder was removed from the mat by shaking, leaving an amount of powder corresponding to about ¼ the weight of the mat, after which the mat was permitted to return to ambient temperature. It was observed that the particles of urethane had become bonded to the fibers, and had become bonded then to each other at their points of direct contact. Also the blowing agent became active at ambient temperature to cause the particles to enlarge whereby each particle covered many times the area which it originally occupied on a particular filament. The individual particles appeared to become cellular during this time. After about a minute at ambient temperature (80° F.) the mat was compacted 50%, restrained at this volume, and placed in an oven heated to 200° F. It was observed that during the first one or two minutes of heating the particles continued to expand. Where the expanding particles came into contact with each other they fused together. Also they tended to fuse and bond over and around the filaments. I observe that urethane could be expanded and cured either at elevated curing or, with greater time, at ambient temperatures. While each procedure is considered to have useful application, it was observed that when curing at ambient temperatures, there was more tendency towards forming a mass of smaller individual bubbles, whereas the application of heat (e.g. 200° F.) immediately following application of the powder and while the urethane particles were soft, the expansion achieves greater particle fusion and filament attachment. After about 10 minutes at 200° F., the expanded particles of hard fused urthane form a firm and springy mass of filaments, with the urethane being firmly bonded to the filaments, and with the filaments being attached at their multiple points of contact. A microscopic examination of the finished batts revealed the presence of the expanded and fused urethane particles bonded to the filaments, and the fact that the filaments at their points of contact were attached together. After such treatment the batting or filter pad had remarkable springiness, compared to the original cotton mat. A particular value when such a batt is used as a filter pad is that the positive multiplicity of attachment of the filaments prevents collapsing when in use. The procedure just described was repeated with even better results using mats made of 15 denier filaments of rayon, nylon and acrylic fibers. This test was repeated with so-called "Rigid" Urethane, "Flexible" Urethane and Chemically Blown Pliovic AO compounded with Flexol 180 and Naugatuck AZ-DOP paste, and with activated latexes. The Pliovic composition was heated to 300° F. for setting. It was observed that when a mat was compressed to, for example, one-half its volume before curing or setting, the compressed volume was retained.

EXAMPLE 27

The procedure in this instance was carried out to demonstrate application of the invention in the manufacture of such products as nonwoven fabrics, nonwoven molded or formed fabrics, and molded forms comprising filamentary materials. A loose mat (lap) of rayon fibers, about 1 inch thick, was precooled to —5° F. It was then placed within the zone of airborne powder produced as in Example 24. During a period of about 5 seconds the powder was deposited within the fiber mass and was further distributed by passage of a significant volume of cold air. While the product was still cold, and after shaking out excessive powder, the fibers were divided into 1 ounce samples. The retention of low temperature kept the masses non-sticky. In this non-sticky form they were forced into separate cellophane bags of varying shapes, each having a volume of a simple bag 3 inches square and 5 inches deep. This size provided sufficient compression of the masses when the bags were tied or sealed. Some of the bags were allowed to cure in this form at ambient temperatures. Six were further pressed together in a tight fitting cardboard box and cured at ambient temperature. Some were compressed to about ⅓ of their thickness by placing a 2 pound weight on top of the bags and then curing in an oven for 15 minutes at 200° F. These various finished battings of varying volumes and densities possessed the properties described in Example 26 and were usable as preformed industrial battings. When removed from the bags, they retained the volume, shape and contours of the bag form. Such battings in various shapes and sizes are deemed to be useful as thermal insulation, bedding materials, filtration pads, and for upholstering. When backed with cotton cloth and formed in desired shapes and lengths, they can be used for medical bandages and fillings.

EXAMPLE 28

The procedure was generally the same as in Example 27, except that a 15 denier nylon sliver about 3 inches in diameter was formed from a carded lap. It was coated as in Example 26, after precooling to 0° F. As it was removed from the low temperature depositing area it was surfaced on one side with a gauze, and then it was rolled up and cut to provide about four convolutions. This roll was wrapped in paper and placed in a carton which compressed it into a roll about 1½ inches thick and about 4 inches wide. After packaging in the carton it was heated to 150° F., which set the urethane hard. After a month's storage, the package was reopened, and though the pad was set in its rolled shape and volume, it could be sprung enough to apply as a bandage, as, for example, to an arm or leg. It was noted that the bandage was quite springy and provided considerable amount of shock resistance. When compressed and released, it immediately assumed its preset volume. It was light and airy and allowed for passage of air. When made with rayon (15 denier) or acrylic nylon, it was absorbent, but with delayed absorbency in contrast with the original fibers. Although filament attachment is practical with thin filaments like cotton and other fibers, best results in terms of springiness, retention of molded shapes, and development of isotropic properties is achieved with thicker filaments as illustrated by the 15 denier filaments commonly used in carpeting. When made with nylon, it was not absorbent, but a certain amount of wicking action was apparent which was relative to the density of filament compaction. An advantage of nylon is inflammability. A combination of absorbent cotton filaments and nylon filaments provided absorbency, minimized inflammability and retained springiness.

EXAMPLE 29

It was observed in Example 27 and Example 28 that the ratio of from 10% to around 50% of urethane powder in proportion to weight of rayon filaments provided the desired attachment of filaments, with the rayon largely retaining its filamentary identity. The procedure in this example was the same as in Example 27, except that the amount of urethane applied was about ⅔ of the combined weight of treated rayon filaments and resin. The filaments were coated as described, and after coating, 4 ounces of filament containing a surface coating of slightly more than 6 ounces of urethane were compressed and molded into a cube about 8 inches square. The molded cube was cured in an oven at 240° F. for 1 hour. The resulting product was a rigid cube. The blown cellular urethane appeared to fill much of the voids between the fibers. The block visibly differed from one made by urethane alone. This example was repeated with less compression during curing, with the result that the fiber remained distributed throughout a greater volume. The example was repeated, using so-called flexible urethane, with similar results, except for the more resilient character of the resulting body. Sisal and jute fibers were also used in place of rayon with good results. The product produced by the use of sisal and flexible urethane appeared to be suitable for upholstery and for undercarpeting. It has a tough though resilient character. Here again the character of the product depended upon the proportion between the fiber and the urethane powder, the degree of pulverization of the urethane, the type of filament and its denier thickness, and the compression applied during the curing step. Even with as much as ⅔ of the finished product being urethane it was obviously a textile product with the filaments predominating. Its compression, isotropic properties, resiliency, extension and recovery were all different than the resin or the fiber, taken separately.

EXAMPLE 30

An fine airborne urethane powder was produced in the same manner as described in Example 24. A strand at 60° F. containing about 150 continuous nylon filaments (7917–99–4200–224–B–1R) in untwisted form, was supported at its ends without stretching and passed through the depositing area whereby the airborne powder particles were applied for a period of 4 seconds. The strand was not prechilled but it rapidly became chilled during application. Excess clinging powder was then removed by gentle shaking. Immediately after the application the strand was passed into an oven-like area heaetd to 400° F., for about 10 to 20 seconds. The untensioned strands allow the individual filaments to contract in the heat and thereby effect some degree of crimping or filament directional alteration. After 10–20 seconds in the oven, it was observed that the individual urethane particles had greatly expanded and that the filaments had become attached at their points of contact. The particles had not cured to he point of producing a hard set, but the flash heating had effected expansion and had vaporized enough of the blowing agent whereby setting had commenced and the stickiness had been eliminated. This meant that in anticipated commercial production, friction rolls could at this point reel the strands out of the blowing area and along a more lengthy and lower temperature curing area. Following the foregoing, strands were then held in a secondary heated zone at 200° F. for about 2 minutes. Thereafter, they were rapidly cooled and reeled onto a spool. The urethane particles then appeared to have completely set, and were firmly attached to the filaments. In addition, the filaments between their attached points of contact had contracted, giving an isotropic substance to the strand. The finished strand was observed to be relatively springy compared to the untreated strands. It had lateral and lengthwise extensibility and retraction and there was a crimping appearance which I attribute to shrinking between spaced and bonded contact points of the filaments. This method of contacting fibers retaining air voids produced strands and non-woven articles of extensible properties. This example demonstrated the feasibility of expanding and partially setting urethane (or like resins) at an accelerated rate by application of elevated temperature for a short time, whereby the feeding or initial restraining devices can be operated in nonsticky but incompletely cured resin. It also demonstrated the feasibility of treating untwisted continuous fiber strands to produce a treated strand, which can be used with or without subsequent twisting, and which has new characteristics with reference to the finish applied, the random attachment of fibers and the results thereof of extensibility and retraction, bulkiness, covering power of a given amount of yarn and appearance and feel.

EXAMPLE 31

The procedure was generally the same as in Example 30. However, in place of treating continuous nylon filament strands, strands of rayon fibers and cotton were treated. These strands were in the form known in the industry as staple "slivers" and were relatively untwisted and bulky. The results were generally the same as in Example 30 although the crimping or directional shrinking deviation of filaments did not seem to be as great.

EXAMPLE 32

The procedure was the same as in Example 31. However, the curing step was modified by pressing with a heated (250° F.) iron immediately following coating, which produced a flat bonded ribbon. Also, after setting at ambient temperature for about 10 minutes, I passed the coated sliver through a laundry type mangle heated to about 250° F. which gave a flattened sliver which retained much of the natural bulk of the original article. It was found that the mangle could be adjusted with varied tension on the sliver to effect varying degrees of compression and that the pressure could be applied with varying degrees of tension on the sliver. In all of the above instances the filaments were bonded or attached together at various points of contact. The bonded sliver pressed with a hand iron was characterized by relatively fixed positioning between the filaments. However, the slivers passed through a mangle, with varying degrees of compression, exhibited the desirable features of extensibility and retraction in length and width, and at the same time developed a lineal strength much stronger than the original staple sliver, suitable for many industrial applications. Staple slivers coated with urethane (rigid) as just described were later "slubbed" (i.e., drawn into the first stages of yarn formation) as described later in Example 43, with a small amount of oil to aid their passage through the die orifice.

EXAMPLE 33

The procedure was the same as in Example 30. However, common staple cotton, wool, and rayon spun yarns were employed. The treated yarns had a marked springiness and strength. These yarns were also treated with a wax-lime thermoplastic as described in Example 8, which provided water repellency, and a softness and substance feel to the hand, which was particularly evident after the yarn was woven.

EXAMPLE 34

The procedure was generally the same as in Example 30. However, immediately after applying the urethane powder the untwisted strand was tensioned in the direction of its length, whereby the diameter of the yarn was reduced. Tension was retained during the heating after the urethane powder had been applied. The yarn treated in this manner retained a round shape comparable to that which it assumed under tension, and it was observed that the filaments were bonded together along their points of contact. In general this type of yarn had linear and lateral strength and a size, appearance and strength comparable to a twisted yarn.

EXAMPLE 35

The procedure was generally the same as in Example 30. However, after the first heating stage the strand of untwisted continuous filaments was placed under mild tension as in Example 34, and the tension retained through the final phases of curing. This served to reduce the diameter of the strand, converting it from a flat ribbon-like strand to rounded cross-section, simulating conventional twisted yarn. Compactness of the strand could be varied with the degree of tension, but with the mild tension applied in this example, a bulky strand was developed which retained much of the width and lateral extensibility and contraction developed in the initial heating stage. Filament contraction occurred in the initial phase of curing to fix the filaments at their points of contact, whereby the desired springy character was retained in the finished piece. It was noted that upon twisting the strand, while applying linear tension, the twist was retained in the final product, together with the bulky character.

EXAMPLE 36

The procedure was followed as in Example 30, to the point of applying the urethane powder to untwisted strands. Thereafter the strands were subjected to compression and heating by direct contact and pressure with a hand iron, at temperatures of the order of 250° F. It was observed that the individual particles of urethane powder had been expanded, fused, and caused to bond and coat the filaments. The yarn was flattened like a ribbon, with individual filaments bonded together at points of contact. This example demonstrated the feasibility of passing yarns through heated rollers after application of the urethane powder. It was observed in this connection that there was a surprisingly limited tendency for the urethane to adhere to the heated metal with which it was contacted. Teflon coated rolls can be employed to reduce any tendency toward sticking. The yarns finished in this manner were relatively smooth, which I attribute to the fusion of the expanded urethane particles with flowing of the urethane over the filaments. It was also observed that to obtain optimum flow and finish, the hot iron should be applied before the urethane had an opportunity to set. By using a Bendix home ironer with varying degrees of compression, I was able to control the compactness of the strand, while retaining desired springiness. Also I could feed the strand in at one end of the roll of the ironer, wrap it around for several wraps, and reel it off the far end of the roll onto a spool.

EXAMPLE 37

The procedure was the same as in Example 27. However, instead of using a mat of rayon fiber, the mat was made of shredded wood (excelsior). The excelsior mass was about 3 inches thick, and without prechilling (due to extensive bulkiness and air voids present), the mat was exposed to the airborne rigid urethane for a period of about 10 seconds. Thereafter, the mat was compressed to about 2 inches thick with gauze on all sides, and allowed to cure at ambient temperature while retaining compression by stacking a number together. The finished mat was in the form of a filiter pad, suitable for water cooling units. The individual strands were locked together at their points of contact, thereby restraining the natural tendency of the mat to compress with use and with the weight of the water pouring through it. Similar applications were made with other filaments, resulting in filter pads with "locked-in-place" filter strands. These pads were made of sisal, fiberglass, steel, wool, paper, and rubber. Besides their use as filter pads, such pads can be employed for thermal insulation, batting (with fiberglass), and carpet cushioning and upholstering (with rubber filaments). I made various filter pads interlocking the filaments at their points of contact with varying quantities of urethane. I found effectiveness commenced with around 10% resin (i.e. 10% of weight of untreated pad), with optimum attachment generally around 25 to 33%. Variance is relative to the thickness of the filament, as well as the selection of resin and degree of attachment. Degree of compression is an important factor in developing overall strength and individual filament attachment, because the compression multiplies the number of contact points between the filaments. Theoretically maximum effective compression would have the filaments in total contact with each other, but to the extent compression is less than maximum, filaments are attached at random points of contact resulting in voids between filaments. Total absence of compression of a mass of filaments produces attachment of clusters of filaments which are in mass stronger than the uncoated laments but not nearly as strong, or as tightly attached individually, as where compression is present in the curing step. Generally, optimum compression for these purposes produces a product about equally divided between filaments and air voids, resulting in a new product particularly suited to filtering pads and other uses. Besides excelsior I made filter pads of nylon, jute, sisal, and steel wool.

EXAMPLE 38

The coating material was produced and deposited in textile filaments in the manner described in Example 25. However, in this instance the mat or web of rayon fiber (1 oz.) was precooled to −20° F. and stuffed into the polyethylene bag. Then about 5 grams of cold powdered urethane powder was deposited on top of the cotton fibers, and the bag closed in such a manner as to allow passage of escaping vapors. Then the bag was agitated on a vibrating screen for 1 minute, to distribute the dust evenly throughout the fibers. Bags prepared in this manner were then packaged, 24 bags to the carton, with sufficient compression to develop a desired predetermined volume for the final product. During curing at ambient temperature, the urethane expanded and gradually hardened on the filaments. When opened 10 days later it was observed that the urethane had bonded the rayon filaments together at their points of contact, thus fixing the volume and imparting a marked springiness. Such pads or batting could be used with the polyethylene bag intact, or the bag could be readily stripped off, leaving a smooth surface exterior on the batting. Likewise the mat could be packaged in desired shapes and thicknesses suitable for use as bandages.

EXAMPLE 39

The purpose of this example was to demonstrate the use of fibers or filaments treated by my method for making medical casts and protective bandages. I first took 8 ounces of a carded 15 Denier Nylon lap and pulled the filaments apart so that they were very bulky and the filaments were in random direction and contacts. I then prechilled the filaments to 0° F. and placed them in a prechilled (−20° F.) double walled poly bag. Immediately I dusted in 15 grams of powdered rigid urethane produced as described in Example 25. I shook the bag violently for ½ inmute and then removed the filaments, and while they were still cold, I separated them into a mass of individual clusters of fibers each about 2 inches thick, and allowed them to cure in this unrestrained manner at ambient temperature. My objective was to develop a large volume with the filaments attached just enough to hold together during storage and distribution. After 4 horus I packaged the 8 ounces of nylon plus the 15 grams of coating urethane in a large polyethylene bag and packed it in a clamp lid 5 gallon tin can and noticed that it filled the can. I then stored the can for one week with periodic agitation to simulate shipment. Upon removing the lid I noticed that the major volume was still present. I then stored the tin in a freeze box at 0° F. A week later I wrapped the limb of a subject with gauze and attached splints in the usual fashion. In this instance they were simply tied to the limb with the gauze. I then removed the tin from the freeze cabinet, removed the bag containing preattached filaments and deposited into the bag 2 ounces of cold urethane powder produced as described in Example 25. I shook the closed bag violently for 20 seconds, opened the bag, took out the filaments with attached urethane, manually arranged them to conform to the splinted limb area, and gently wrapped them around the limb. They were about 3 inches thick. I carefully overlapped the areas that mat, endeavoring to properly form the cast before adhesiveness developed with increasing temperature. I then overwrapped the area and enclosed the filaments in gauze, drawing the gauze tight enough to compress the filament mass from 3 inches in thickness to about 2 inches. By this time the cast had warmed and was adhesive enough to attach the gauze without any more attachment than a few pins. I then placed a heat lamp on each side of the case for 30 minutes. This developed a temperature of the cast of around 80° F. at inner areas, and around 120° F. at and near the surface. This was adequate to set the cast hard enough to hold the splints in place and to permit functioning of the limb. In another instance, to simulate preparation in an equipped area and application at a later time in another area, I introduced a quantity of pulverized Dry Ice to the filaments in the can after the urethane powder had been applied as previously described, but before setting. The added Dry Ice was in sufficient quantity to reduce and retain the temperature at minus 40° F., which was adequate to retard further setting of the urethane until the case was applied as described, several hours later. After setting the urethane, I removed the gauze about 2 hours after application. This left the urethane treated and attached nylon filaments as a springy porous supporting cast. A cast prepared in this manner appeared to have many advantages over a plaster cast, particularly in that it can be applied rapidly and without discomfort, while at the same time affording a substantial amount of insulation and yieldable support and resilient protection. Its strength on dummy casts seems strong enough to firmly hold splints in place.

EXAMPLE 40

A solution of fluorocarbon resin and water was prepared in the same manner as in Example 16. This material was then supplied to a pressurized atomizer of the paint spray type, and atomized. A piece of commercial wax paper was chilled by placing it upon a slab of Dry Ice, and the atomized particles from the paint spray gun directed to fall upon the exposed paper surface. The particles froze almost immediately upon contact with the cold paper, forming a frozen coating which was effectively bonded to the paper. It was noted that the paper could be bent without flaking off the coating. While the paper was at a temperature sufficiently low (e.g., below 32° F.) to maintain the coating frozen, it was placed over wool cloth, with the coated side down. A hand iron at a temperature of 300° F. was applied over the paper, with normal pressing force. After ironing the paper was removed while the wax was fluid and then the cloth was again ironed to flow and set the coating. It was observed that the coating of resin was transferred from the paper to the cloth, together with some of the wax from the paper. The cloth so treated was water and salad oil repellent, and the wax present provided a desired feel and thickness to the fabric. Similar coated paper was formed by prechilling the liquid to a partially frozen mass or "slush" and thence spreading it over the chilled paper with a "doctor knife." Setting was also developed with conventional pressurized steam pressing equipment. Similar and even more uniform coated paper was made by producing a powder as described in Example 17 and dusting it on a sheet of wax paper at ambient or warmer temperatures, and after melting, fixing the liquid droplets by application of low temperature.

EXAMPLE 41

An 80 grain rayon sliver was drawn from a warp of a carding machine and was coated with a wax-like material by the procedure described in Example 8. During the initial phase of heating (at 300° F.) the silver was not tensioned to any substantial extent. Near the end of the heating operation the sliver was drawn through the restricted orifice of a die, thereby compressing the sliver and increasing the number of contacts between filaments. The resulting strand had a smooth exterior and a diameter similar to the original sliver. The increase in bonding was not sufficient to hold the filaments in compact form. However, this method resulted in maximum effective coating of individual filaments while retaining filament freedom. After being treated the sliver was "slubbed" to a .40 hank by roving on a 12 x 6 slubber. It was then spun to 1.25 cotton count from 2 ends of the .40 hank, roving being on a unit known in the trade as a "speeder." It was plied to 4TPI to 1.25/2 ply yarn and tufted on ⅜₁₆″ gauge to produce a loop pile carpet. The pile was water repellent and noticeable bodying properties were imparted by the thermoplastic wax-like material.

EXAMPLE 42

The pile of the carpet produced as described in Example 24 was later coated with rigid urethane prepared in the manner described in Example 24 but with the following adaptations that are particularly applicable to carpet mateiral of pile, loop pile, or tufted design. While passing under the depositing mill or dusting device, the carpet was progressively bent and drawn over a ⅜″ rod, which opened the pile to allow the dust to fall and distribute well beneath the normal surface. After this effective dust impregnation the carpet (without a backing) was immediately drawn over a perforated suction plate which served to more effectively draw the powder particles into the carpet. Also agitation was applied following deposit to promote settling of the powder throughout the substrate area. Just prior to removal from the depositing area the rug was inverted and vibrated by light tapping thereby causing some excess powder to drop off. This carpet was partially cured by heating and the curing completed by storage for an extended time at ambient temperature. The initial curing step was carried out by passing the carpet four times over a roller to open the pile and to minimize adhesions between pile or tufts, while applying radiant heat to raise the temperature of the carpet to about 300–350° F., for cotton, and a lower temperature for rayon, for example, 225° F. Brushing and combing was applied to the pile while being drawn over the rollers thereby breaking apart loops tending to adhere together and removing any oversize bubbly material. In one instance brushing and combing was applied after the first five minutes following exposure of the carpet to air at 250° F., and again 15 minutes after such exposure. Total time for initial curing was 30 minutes, but additional hardening was developed after the carpet was removed from the heated area and stored at ambient temperature. Brushing and combing was applied when the carpet was removed from the heat, and the best results were obtained when the rug was flexed over a rod and simultaneously brushed and combed at this point.

EXAMPLE 43

After the finish was applied to the carpet by the procedure described in Example 42, and after setting and initial hardening, a further coating of urethane, which was compounded to be flexible when cured, was applied to the backing. At the time of application of the cold powder, the carpet was at a temperature slightly above ambient thereby causing good surface bonding and agglomeration to provide a relatively heavy protective coating. The coating material used for this purpose was somewhat coarser than used for finish on the pile side. However, it was noted that the finer power tended to provide a more uniform application and expansion. The initial deposit appeared to be about 1/64″ thick. While adhesiveness was still present and during the early period of expansion, a conventional porous carpet backing cloth was applied and gently laminated against the partially expanded urethane, with the result that the backing resin was uniformly controlled in its expansion and firmly attached to the carpet and to the laminated backing cloth. A carpet provided with a backing in the manner described has a number of desirable features in addition to the usual function of cementing the piling. Principally this is an attached cushion which is both light in weight and springy.

EXAMPLE 44

Flax seed was coated with urethane by my process to develop seeds of greater size. The urethane was brittleized and comminuted in the manner described in Example 25. The seed was surface heated to 130° F. Equal amounts of the cold urethane powder and flax seed were placed into a multiwell prechilled poly bag and agitated effecting an instant coating of the cold airborne dust on the intruded warm seeds. The bag was subjected to continuous agitation for a coating period of about 10 seconds. A small amount of powdered Dry Ice was progressively added to be certain that after coating was completed the resulting temperature level would be below 32° F. and preferably of the order minus 20° F. Then the cold coated individual flax seeds were rapidly deposited into a stream of hot air (400° F.) whereby the coated particles were flash heated to cure the urethane beyond its active adhesive period, and to the point where the seeds could be collected and further cured, as for example, in a tumbler while the seeds were likewise agitated to minimize formation of clumps. Seeds tending to clump or agglomerate into masses were readily broken apart by light attrition or by passing through rollers, while the urethane was in a friable condition.

EXAMPLE 45

The procedure was generally the same as described in Example 44 except that just enough Dry Ice was used to allow the particles to adhere together in a clump, and with the temperature level being sufficiently low (e.g. 0° F.) to avoid expanding the urethane coating. At this stage the particles can be readily separated by simple forms of attrition. The particles then can be dispersed into a forced draft of hot air, or deposited onto an agitated heated plate, or dispersed over a surface and allowed to expand and set at ambient temperatures. The principle involved is that there is a temperature level (e.g. 0° F. or a little higher) where the particles can be separated from each other, each retaining a desired amount or resin. Then the expansion and curing can be achieved as previously described, retaining the particles separate from each other until their adhesive period is passed. After this point they can be tumbled or otherwise agitated to effect final expansion and setting.

EXAMPLE 46

The procedure was the same as described in Example 45, except that after depositing the urethane and while the seeds are clumped together but still cold enough to restrict rapid expansion, they are intermixed with dry starch (or other selected inert powdered dry dispersants like Bentonite, talc, powdered bark, powdered fertilizer, etc.) with some attrition to separate the seeds. In this instance, the starch was 150° F., which accelerated the cure step and minimized the adhesive period. The amount of starch was about 5 times the weight of the coated seeds. The starch formed a relatively thick coating on the seeds. A smooth rounded surface contour was developed by passing the coated seeds through soft rubber pressing rolls while the urethane was still pliable. After the urethane had essentially set at ambient temperature, the coated seeds were separated from the excess starch by screening, and they were briefly exposed to steam during tumbling to cause the starch to form a glazed surface.

The above Examples 44, 45, and 46 were repeated using fertilizer and insecticidal pellets in place of seeds.

EXAMPLE 47

Commercial pelletized fertilizer (containing nitrogen, potash and phosphate ingredients) was heated to 160° F. While being agitated in a mixer, cold urethane powder, produced as in Example 25 was added in the ratio of one part urethane to 5 parts of pellets. Clumps formed, due to stickiness of the urethane. About ½ minute after adding the urethane I added powdered fertilizer of the same formulation as the pellets, in the ratio of 1 part coated pellets to 5 parts powdered fertilizer. Agitation was then increased for 1 minute after which the material was delivered to a slow speed tumbler, where it remained for 1 hour. Thereafter, the coated pellets were separated from the powder by screening. The pellets were encapsulated with urethane and powder. The final product had characteristics as follows: It was a free flowing material comprising discrete pellets. Compared to the original pellets, leaching time was greatly extended, although the surface powder was immediately available. In other words there was a differential leaching action. The product was substantially less hydroscopic than the source pellets, due to the protective action of the coating, and it was substantially harder and more resistant to crushing and attrition. In a water dissolving test the control sample (pellets manufactured by the Best Fertilizer Co.) dissolved completely in 5 days, whereas the urethane coated sample was apparently completely intact in 60 days completely submerged in cold water.

EXAMPLE 48

The purpose of this example was to demonstrate that my method can be used for finishing the cut edges of carton blanks whereby they are made water and vapor repellant. One hundred (100) carton blanks of the cellulose fiberboard type, used in the marketing of piecrust premixes, were assembled as a stack. The sides of the stack were subjected to application of urethane powder, utilizing a urethane dispersion as described in Example 24. Thereafter the edges were contacted with an iron heated to 300° F. Tests indicated that this treatment served to impart moisture and vapor resistance to the cut edges. The coating should not interfere with separation of the blanks by automatic packaging equipment.

EXAMPLE 49

The coating material was a liquid latex emulsion, namely, Naugatex 2752, manufactured by the Maugatuck Chemical Co., Division of the U.S. Rubber Company. This is a styrene-butadiene adhesive resin latex, containing 46% solids. This material was diluted by the addition of 25% water. Then the diluted liquid was frozen by pouring a thin film (⅛ inch thick) on a metal plate cooled to 30° F. below zero. When frozen it was comminuted on a Waring type attrition mill and applied as a power directly onto a cotton carpet precooled to 0° F. The carpet was agitated to effect settling of the latex into interior substrates, and then into an oven at 300° F. for 30 minutes, during which time the moisture was largely removed and the resin set and bonded to the filaments. The resin bonded yarn filaments together at points of contact but did not attach the loop piling of the carpet together.

EXAMPLE 50

The objective of this example was to demonstrate the use of resin blends, such as blend of "rigid" and "flexible" urethanes. The "rigid" urethane employed was procured from Reichhold Chemical Company and was blended from two components in equal parts, namely, No. 92–322 and No. 92–332. The "flexible" urethane was procured from the Polytron Co. and was No. 423, with the addition of 3½% of catalyst No. 035–35A. Both samples were stirred separately for 1½ minutes at 50° F., and poured on Dry Ice as separate slabs each about ⅛ inch thick. The resulting cold brittle slabs were broken into flake sizes about 1 inch square, and with an equal part of Dry Ice mixed in the proportions of 1 part flexible urethane, 1 part rigid urethane and 1 part Dry Ice, and then ground ½ minute in a Waring type attrition mill, having a bowl which confined the product over rotor. A rayon lap of 2 square feet and ½ inch thick, weighing 1 ounce, was chilled to 0° F., and placed in a polyethylene bag. 1½ ounces of the combined urethane powder was introduced into the bag, the bag was closed rapidly, and manually shaken for ½ minute. The rayon lap was then removed and while still not adhesive, and at the low temperature developed with Dry Ice, it was spread over the back of an unbacked carpet coated with unset glue. The rayon lap was fluffed up about ¾ inch thick over the square foot of carpet area. A cotton backing cloth was placed over the lap. Metal plates were placed both under and over the carpet and backing, and a 10-lb. weight applied to the top plate. This compressed assembly was then heated in an oven at 200° F. for 30 minutes. When taken from the oven, and the weights and plates removed, the cooled carpet had a tightly adhering backing which was about ⅜ inch thick, the voids being filled in part with expanded urethane. The backing was porous, flexible and resilient. This new and unique carpet backing besides being visually attractive and flexible provided cushioning and dimensional stability. In another instance to achieve novel results and an attractive finish, I incorporated cork particles (about ¼ inch) in the filaments and dusted some on top of the backing after application and before applying the backing cloth.

EXAMPLE 51

I obtained a bale of shredded redwood bark of the type used for insulation. The material was a mixture of individual and attached shreds or coarse fibers, together with small fragments, the major part being shreds about ½ inch long. Separately I produced comminuted frozen urethane powder as described in Example 25. I then heated 5 ounces of the shredded bark to 160° F., and while subjecting the material to rapid manual agitation, I dusted on 2 ounces of urethane frozen powder. The elevated bark temperature effected a rapid blowing and preliminary setting of the urethane, with particles of the powder becoming attached, without forming a continuous coating. Thus the absorbtive properties of the bark were retained. I observed that the treated bark had an unusual capacity to resist clinging of chilled dust-like resin particles at ambient and lower temperatures. Before complete setting, I placed the 7 ounces of treated bark in a conventional type flower pot mold. It was necessary to do this in about 1 minute after application of the powder, because the heated bark serves to accelerate setting. Molding must be carried out while the powder has substantial adhesiveness. I then placed the mold and its filling in an oven at 200° F. for 10 minutes. The mold employed was made of a plastic material of such smooth surface that the resulting redwood bark flower pot could be removed immediately after setting in the oven. The walls of the resulting redwood bark pot were ¾ of an inch thick, providing superior insulation by entrapped air, and having sufficient strength to serve the purposes desired. Its weight was about one-fourth that of conventional crockery and pottery of similar volume. It did not shatter and retained its shape in conventional packaging and shipment. I particularly noted that I could easily blow air by mouth through the thick walls, thus demonstrating that the walls had sufficient porosity whereby the roots of a plant would be able to obtain air through the remaining walls. The density and strength of the walls was such as to hold the planted shrub in the usual way. The redwood bark filaments contributed their usual moisture absorbtive and retention character. Waxing and other surfacing agents of some surface areas can be applied to such a pot to modify air and moisture passage as desired. A particular merit of applying such fast acting resins as urethane by the described low temperature powder process described is that it lends itself to the manufacture of continuous small batches either formed intermittently or progressively. In fact the combination of powder and product can be made immediately prior to incorporation in the mold or actually performed in the mold itself. The value of this can be appreciated when it is considered that mixing of large batches and subsequent handling will set while being processed. Also the use of fast setting resins minimizes both the time consumed and the number of molds required for rapid manufacture.

The method described above in Example 51 was also carried out by the use of jute, and jute blended with redwood filaments.

EXAMPLE 52

The procedure was generally the same as described in Example 51. Except that after applying the powder to the shredded bark, I molded and compressed the material around a stake of wood about ¾ inch square and 2 feet long. The bark was molded completely around the sides and one end of the stake. The other end of the stake was left exposed about 8 inches for driving into the ground. The resulting stake was about 3 inches square. The shredded redwood attached in this manner has a surface porosity that provides for attachment of the roots of clinging or climbing plants. The redwood provides for moisture absorption and retention, and the volume provided by the porous filaments mass promotes coolness and thermal insulation.

EXAMPLE 53

The procedure was generally the same as described in Example 50, except that after depositing the urethane powder on the heated bark I gently agitated the mass, allowing it to cure and set for about 15 minutes. This resulted in clumps of attached filaments. They could be safely manually handled after setting was substantially complete. I then took a flower stake of the type commonly made with dried ferns. This was ¾ inch square with a length of chicken wire attached to it along its length, the wire being about 10 inches wide. A quantity of the clumps were placed on the wire, and then the wire bent to a cylinder about 3 inches in diameter, with the clumps filling the space within the wire and surrounding the stake. By preattachment of the bark shreds or filaments they did not fall out through the wire screen, which had openings (1 inch square) generally wider than the individual shreds. This screen was about 1″ diamond shaped. The resulting screen stake had many of the advantages of conventional moss filled products, plus the properties of redwood bark.

EXAMPLE 54

This example demonstrates application of my invention for encapsulating the roots of nursery plants. Urethane powder was prepared in the same manner as described in Example 25, and was deposited upon the filaments of a loose mass of rayon. While the urethane and the filaments of rayon were still cold and not very sticky, and the danger of organic diisocyanate fumes was negligible (temperature about 0° F.), the mass was subdivided and the small masses manually formed about the roots of several begonia plants. About 1 ounce of soil was retained with the roots in each instance. After wrapping the applied filamentary masses with gauze, each mass was pressed into a flower pot, which was used as a mold. Each pot measured about 3½ inches in diameter at the top, 2 inches in diameter at the bottom, and was about 3 inches deep. These pots were then permitted to set at ambient temperature for 1 hour, to set the resin. Thereafter the formed filamentary masses were removed from the pots and the gauze stripped away. Plant products (24) made in this manner were packed in a strawberry flat. They were watered and held for a period of 5 days to stimulate distribution time. Thereafter they were taken from the crate, soaked in water containing soluble plant food, and after draining, they were returned to pots of the same size as previously used. The then potted products were held for a period of 2 weeks to simulate nursery floor time. Thereafter the plants were removed from the pots and, after cutting the bottoms of the filamentary masses with a knife to encourage rapid and downward growth of the roots, they were planted on the ground.

EXAMPLE 55

The same procedure was followed as in Example 54. However, the treated filamentary mass was used to encapsulate the roots of a small cyprus tree. Three ounces of the treated filamentary mass was formed around the roots of the tree and then overwrapped with gauze. The bottom was pressed flat, leaving the sides rounded. This was then permitted to set for a period of 1 hour at ambient temperature to cure the resin. The walls of fiber surrounding the roots were then sufficiently strong to permit the tree to be packaged with similar plants in cartons, and to ship. Subsequently the bottom of the mass of fiber was cut with a knife and the tree planted in the ground. It was observed that the roots extended themselves into the soil, some of them passing through the filaments forming the side walls.

EXAMPLE 56

A treated mass of loose filaments was formed in the same manner as described in Example 54. However, in this instance the mass of rayon filaments measured about 16 inches long, 6 inches wide, and 1½ inches thick. This mass or strip was laid out on a horizontal supporting surface and then small boxwood plants, with a small amount of dirt clinging to their roots, were laid upon one margin of the strip at intervals of 2 inches. The other margin of the strip was then folded over on top of the roots. This assembly was then placed in a mold which compressed the folded strip into one about 16 inches long, 1 inch thick, and 3 inches deep. The assembly was then permitted to set for a period of 1 hour at ambient temperature to cure the resin. After curing, the assembly was removed from the mold and it was found that it was self-supporting and that the treated filamentary mass afforded resilient supporting walls and retention for the roots, forming in effect a resilient enclosure for the root stock of each of the plants. Water was applied to the assembly to moisten the filamentary mass, after which the assembly was held for 5 days without further watering, at a room temperature somewhat lower than 60° F. The assembly was then further watered and held for a period of about 4 weeks. Then the strip was cut by a knife to separate the several plants into individual encapsulated products and these products were then planted in the ground. Before planting, the filaments at the bottom were pulled apart to facilitate root penetration.

EXAMPLE 57

A loose mass of rayon filaments was treated in the same manner as in Example 54. However, a 9 ounce filamentary precooled batt (0° F.) was treated with 4 ounces of the cold Urethane powder, by introducing the batt into a large polyethylene bag, add the power to the bag, and then agitating the contents. The Urethane powder was mixed with an equal weight of powdered solid Dry Ice. Thereafter, the cold treated mass was divided into 15 equal parts. Each of these was formed manually into the general shape of a sphere, and in the center of each I inserted the end of a tablespoon overwrapped with gauze. Each mass was then pressed into a gauze-lined flower pot, each pot being 6 inches in diameter at the top, 3 inches in diameter at the bottom, and 6 inches high. When within the pot, the end of the upright spoon was about ¾ of an inch from the bottom of the pot, with the compressed mass of filaments filling about ⅔ of the pot. The pots were then placed in an oven at 200° F. for 20 minutes to cure the resin. Thereafter, the filamentary mass was removed from the pot, and the spoon retracted from the center. Also the gauze was stripped off the exterior of the mass. The space left by the spoon was in the form of a curved slit-like pocket with relatively smooth lining surfaces due to compression of the filaments against the surfaces of the spoon during curing. The resiliency imparted to the mass permitted deformation in any direction and this facilitated opening of the pocket manually. The pockets of some of the masses were opened manually and the roots of begonia plants inserted, after which the filaments were permitted to spring back to retain both the stem and the root, holding the plant erect. Water was added to moisten the filaments, and these products then held for several days. After holding for a total of 10 days, the masses were placed in flower pots of the same size as previously used, and then held a further 10 days with some watering to simulate nursery floor time. After opening the filaments of the lower end of each mass, to encourage root growth, they were planted in the ground. It was found that plant foods could be supplied before planting, by adding the food in soluble form to the water. Also it was noted that pulverized soil could be added to the water and that such soil became enmeshed in the voids of the filamentary mass. Some of the plants encapsulated as just described were held for a period of 60 days and longer before planting.

EXAMPLE 58

An amount of polyvinyl chloride was dissolved in tricresyl phosphate to form a thick paste. This paste was cooled to −40° F. and reduced to a powder in the manner described above. This powder was placed in a 150 mesh sieve with a quantity of Dry Ice and a quantity of the powder was sieved onto a swatch of nylon taffeta fabric which was precooled to 0° F., the fabric being agitated during application of the powder. The fabric was then exposed to localized heat for a few seconds to allow the powder thereon to soften, and an additional quantity of powder was sieved onto the fabric while agitating the fabric as was done during the first application of powder. The fabric is then passed, prior to curing through the nip of a pair of calendering rolls, and thereafter, the fabric was exposed to a temperature of 350° F. for a period of 4 minutes to cure the coating material. This resulted in a smooth uniform coat which was tightly bonded to the nylon taffeta. The thickness of the coat can be controlled by adjusting the amounts of powder applied to the fabric in each of the two applications and by maintained temperature differentials.

Other fabrics can be coated with other materials in this manner. The temperatures which are used will depend upon the nature of the coating material and the degree of coating desired.

The first application of powder may be in very fine form, for example 100 mesh, to insure adequate penetration into the fabric, while the second application may be coarser, for example 50 mesh, to provide for greater thickness in the finished coat. Of course, objects other than fabrics can be coated by this process.

I claim:

1. A method of forming a coating on the surface of objects, comprising the steps of cooling the surface of the object to a temperature below 32° F., applying a fine powdered coating material to such surface, the powder containing an uncured synthetic resin, maintaining the powder during application at a temperature below 32° F. to prevent flocculation and thereafter elevating the temperature of the surface and the applied powder to a temperature above 32° F. to set the resin and bond said resin to said surface.

2. A method as in claim 1 in which the object is one formed of filaments or fibers and in which the powder coating material is distributed on the surfaces of the filaments or fibers of the object.

3. A method as in claim 2 in which the powder is dispersed in a gaseous medium at the time of its application, the object being subjected to agitation to facilitate depositing the powder particles into substrate regions of the object, and in which excess powder is removed from the object before the temperature is elevated to set the same.

4. A method as in claim 1 in which the object is a fabric formed of filaments or fibers and in which the fabric is subjected to vibration while the powder is applied thereto to effect distribution of the powder in substrate regions of the fabric.

5. A method as in claim 1 in which the object is a plant seed, the powder being applied to outer surfaces of the seed.

6. A method as in claim 1 in which the object is a fertilizer pellet, the powder being applied to outer surfaces of the pellet.

7. A method as in claim 1 in which the object is a pellet containing an insecticide, the powder being applied to outer surfaces of the pellet.

8. A method as in claim 1 in which the object is a loose porous mass of wood material, the powder being applied to outer surfaces of the wood elements forming the mass.

9. A method for treating a porous web formed of filaments or fibers, the steps of intermixing an activator and a blowing agent with uncured resin material, thereafter chilling the mix to a low temperature below 32° F. to deactivate both the activator and the blowing agent and to make the mix brittle, grinding the brittle material to form a powder, maintaining the powder below 32° F. to prevent flocculation, precooling the web to a temperature below 32° F., depositing the cold powder particles on the precooled web while the web is at a temperature below 32° F., subjecting the web to vibration to cause the powder to deposit into substrate regions, and then elevating the temperature of the web and powder above 32° F. to cause the powder to set and to be bonded to the surfaces of the filaments or fibers.

10. A method as in claim 9 in which the powder is dispersed in a gas at a temperature below 32° at the time of its application.

References Cited

UNITED STATES PATENTS

| | | | |
|---|---|---|---|
| 597,277 | 1/1898 | Fagg | 117—119.2 X |
| 1,901,324 | 3/1933 | Novotny | 117—119.2 |
| 2,595,831 | 5/1952 | De Nie et al. | 241—23 |
| 2,706,311 | 4/1955 | Durst et al. | 260—2.5 X |
| 2,889,291 | 6/1959 | Moore | 260—2.5 X |
| 2,981,631 | 4/1961 | Nagel | 117—21 |
| 2,998,048 | 8/1961 | Sittel | 117—17 X |
| 3,171,870 | 3/1965 | Monteil et al. | 264—28 X |
| 3,280,048 | 10/1966 | Griffin et al. | 260—2.5 |

FOREIGN PATENTS 662,152  4/1963  Canada.

MURRAY KATZ, Primary Examiner

P. ATTAGUILE, Assistant Examiner

U.S. Cl. X.R.

117—21, 100, 140; 241—23; 260—2.5, 28.5